US012412221B2

(12) United States Patent
Jeske et al.

(10) Patent No.: US 12,412,221 B2
(45) Date of Patent: Sep. 9, 2025

(54) MANAGEMENT OF RECONCILIATION AND REPORTING WORKFLOW USING ROBOTIC PROCESS AUTOMATION

(71) Applicant: THE TORONTO-DOMINION BANK, Toronto (CA)

(72) Inventors: Heather May Jeske, Etobicoke (CA); Olga Chirdaris, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 287 days.

(21) Appl. No.: 17/380,378

(22) Filed: Jul. 20, 2021

(65) Prior Publication Data

US 2022/0028010 A1     Jan. 27, 2022

Related U.S. Application Data

(60) Provisional application No. 63/056,128, filed on Jul. 24, 2020.

(51) Int. Cl.
*G06Q 40/12* (2023.01)
*G06F 9/455* (2018.01)
*G06Q 40/03* (2023.01)

(52) U.S. Cl.
CPC ......... *G06Q 40/12* (2013.12); *G06F 9/45558* (2013.01); *G06F 2009/4557* (2013.01); *G06Q 40/03* (2023.01)

(58) Field of Classification Search
CPC .... G06Q 40/12; G06Q 40/03; G06F 9/45558; G06F 2009/4557
See application file for complete search history.

(56) References Cited

U.S. PATENT DOCUMENTS 10,311,360 B1   6/2019   Ares
10,354,225 B2   7/2019   Sharma et al.
(Continued)

FOREIGN PATENT DOCUMENTS

CN    109684400    4/2019
CN    110110996    8/2019

OTHER PUBLICATIONS

Hernandez, "Digital robots and the future of auto lending: Achieving process improvements through automation," PWC.com. Jan. 2020 (4 pages).
(Continued)

*Primary Examiner* — Peter Ludwig
(74) *Attorney, Agent, or Firm* — Nixon Peabody LLP

(57) ABSTRACT

The disclosed exemplary embodiments include computer-implemented processes that manage report and reconciliation workflow through a virtualization of robotic process automation (RPA) techniques. In some examples, an apparatus obtains reporting data that characterizes a status of an obligation during a first temporal interval, and perform operations that request, through a first digital interface of a first application, payment data that characterizes the status of the obligation during a second temporal interval. The reporting data may include information generated during a programmatic chatbot session. Based on the payment data, the apparatus modifies a portion of the reporting data to reflect the status of the obligation during the second temporal interval, and transmits a notification indicative of the modified portion of the reporting data to the first computing system.

14 Claims, 11 Drawing Sheets

(56) References Cited

U.S. PATENT DOCUMENTS

| | | | |
|---|---|---|---|
| 10,402,163 B2 | 9/2019 | Ghatage et al. | |
| 10,482,232 B2* | 11/2019 | Buddhiraju | G06F 21/305 |
| 11,593,592 B2* | 2/2023 | Zambetti, Jr. | G06F 40/247 |
| 11,790,287 B2* | 10/2023 | Cella | G06Q 20/0655 |
| | | | 705/37 |
| 11,850,750 B1* | 12/2023 | Ganesan | G06N 5/025 |
| 2009/0049168 A1* | 2/2009 | Galvin | H04L 51/04 |
| | | | 709/224 |
| 2010/0185946 A1* | 7/2010 | Seacat DeLuca | G06F 9/451 |
| | | | 715/702 |
| 2018/0345489 A1 | 12/2018 | Allen, IV et al. | |
| 2019/0050269 A1* | 2/2019 | Anderson | G06F 9/5077 |
| 2019/0104093 A1* | 4/2019 | Lim | H04L 51/04 |
| 2019/0147382 A1 | 5/2019 | Krishnamurthy | |
| 2019/0244149 A1* | 8/2019 | Krishnaswamy | G06Q 10/0637 |
| 2019/0303779 A1* | 10/2019 | Van Briggle | G06F 9/485 |
| 2020/0012980 A1 | 1/2020 | Li et al. | |
| 2020/0384644 A1* | 12/2020 | Chae | G06F 8/36 |
| 2021/0041845 A1* | 2/2021 | Allen, IV | G05B 19/0421 |
| 2021/0357236 A1* | 11/2021 | Cohen | G06F 8/34 |
| 2021/0374479 A1* | 12/2021 | Zambetti, Jr. | G06F 18/217 |
| 2022/0121982 A1* | 4/2022 | Rajagopalan | G06F 9/5011 |
| 2022/0244927 A1* | 8/2022 | Dabhi | G06F 8/443 |
| 2023/0236585 A1* | 7/2023 | Anand | G06F 11/362 |
| | | | 718/100 |

OTHER PUBLICATIONS

"Robotic Process Automation (RPA) Tutorial: What is Tools & Example," Guru99.com, Jan. 2020, retrieved from https://www.guru99.com/robotic-process-automation-tutorial.html on Jul. 19, 2021 (20 pages).

* cited by examiner

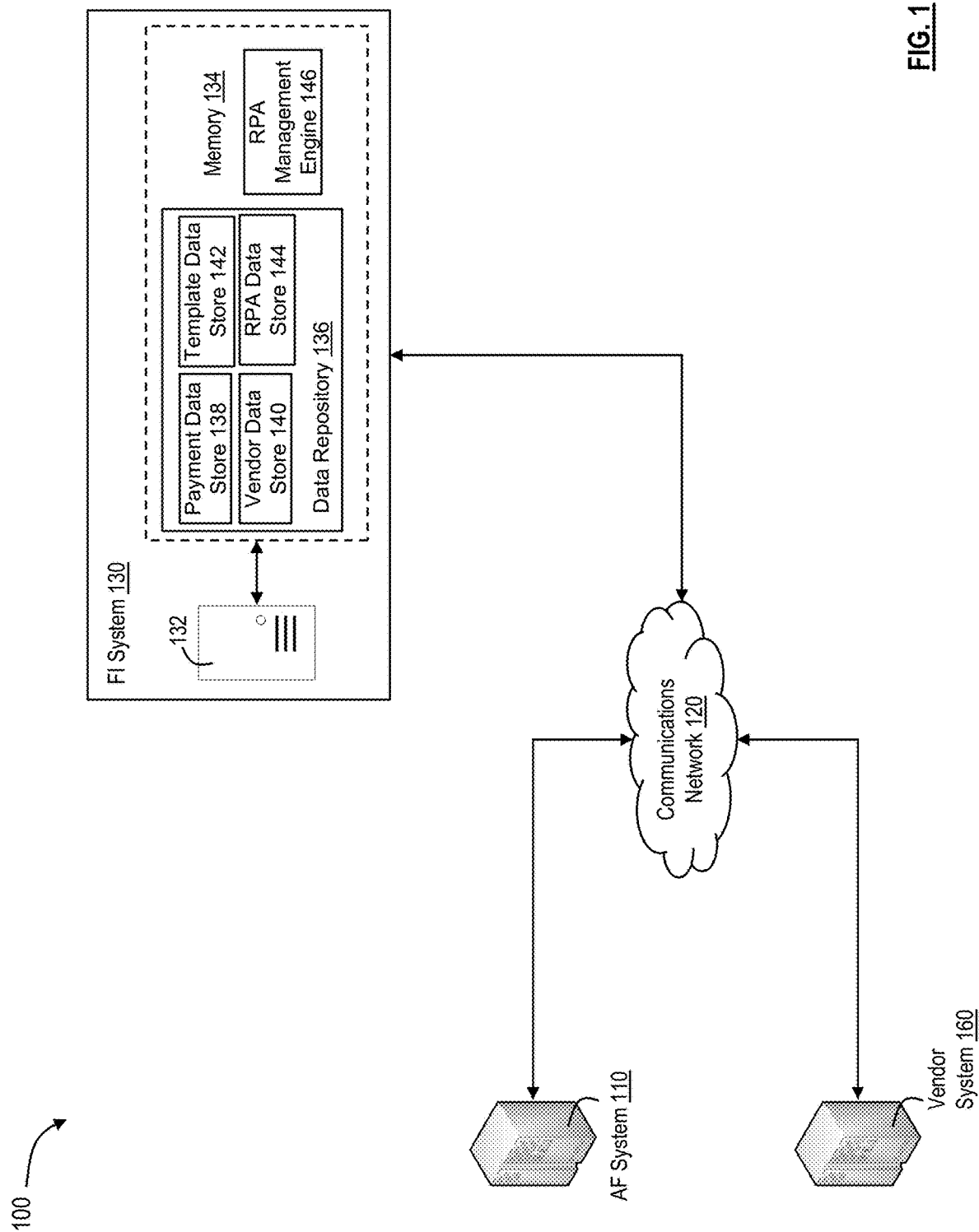

MANAGEMENT OF RECONCILIATION AND REPORTING WORKFLOW USING ROBOTIC PROCESS AUTOMATION

CROSS-REFERENCE TO RELATED APPLICATION

This application claims the benefit of priority under 35 U.S.C. § 119(e) to prior U.S. Application No. 63/056,128, filed Jul. 24, 2020, the disclosure of which is incorporated by reference herein to its entirety.

TECHNICAL FIELD

The disclosed embodiments generally relate to computer-implemented systems and processes that manage reconciliation and reporting workflow using robotic process automation.

BACKGROUND

Today, financial institutions selectively provision a variety of financial products to their customers, and examples of these financial products include one or more secured or unsecured credit products associated with corresponding repayment schedules. For instance, a financial institution may provision an automotive loan to a customer, and the automotive loan may be secured against a purchased automobile and may be associated with a corresponding period of redemption during which the customer initiates scheduled payments. The customer may, for example, elect to fund a scheduled payment using a third-party account issued by an unrelated financial institution. Due to uncertainties regarding the status of the third-party account, the financial institution may delay a reconciliation of the scheduled payment until completion of a clearance and settlement process. Further, during the redemption period of the automotive loan, the financial institution may elect to generate additional proceeds from the automotive loan by selling or assigning the automotive loan to an unrelated, third-party loan servicer.

SUMMARY

In some examples, an apparatus includes a memory storing instructions, a communications interface, and at least one processor coupled to the memory and the communications interface. The at least one processor is configured to execute the instructions to obtain reporting data that characterizes a status of an obligation during a first temporal interval. The at least one processor is further configured to execute the instructions to, via the communications interface, perform operations that (i) access a first digital interface of a first application program executed at a first computing system, and (ii) request, through the first digital interface, payment data that characterizes the status of the obligation during a second temporal interval. The at least one processor is further configured to execute the instructions to modify a portion of the reporting data based on the payment data. The modified portion of the reporting data reflects the status of the obligation during the second temporal interval. The at least one processor is further configured to execute the instructions to transmit, via the communications interface, a notification indicative of the modified portion of the reporting data to the first computing system.

In other examples, a computer-implemented method includes obtaining, using at least one processor, reporting data that characterizes a status of an obligation during a first temporal interval. The computer-implemented method also includes, using the at least one processor, performing operations that (i) access a first digital interface of a first application program executed at a first computing system, and (ii) request, through the first digital interface, payment data that characterizes the status of the obligation during a second temporal interval. The computer-implemented method includes modifying, using the at least one processor, a portion of the reporting data based on the payment data. The modified portion of the reporting data reflects the status of the obligation during the second temporal interval. The computer-implemented method also includes transmitting, using the at least one processor, a notification indicative of the modified portion of the reporting data to at least one second computing system.

Additionally, in some examples, a tangible, non-transitory computer-readable medium storing instructions that, when executed by at least one processor, cause the at least one processor to perform a method that includes obtaining reporting data that characterizes a status of an obligation during a first temporal interval. The method also includes performing operations that (i) access a digital interface of an application program executed at a first computing system, and (ii) request, through the digital interface, payment data that characterizes the status of the obligation during a second temporal interval. The method also includes modifying a portion of the reporting data based on the payment data. The modified portion of the reporting data reflects the status of the obligation during the second temporal interval. The method also includes transmitting a notification indicative of the modified portion of the reporting data to at least one second computing system.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 1, 2A, 2B, and 2C are block diagrams illustrating portions of an exemplary computing environment, in accordance with some exemplary embodiments.

Like reference numbers and designations in the various drawings indicate like elements.

DETAILED DESCRIPTION

Figure 2A:
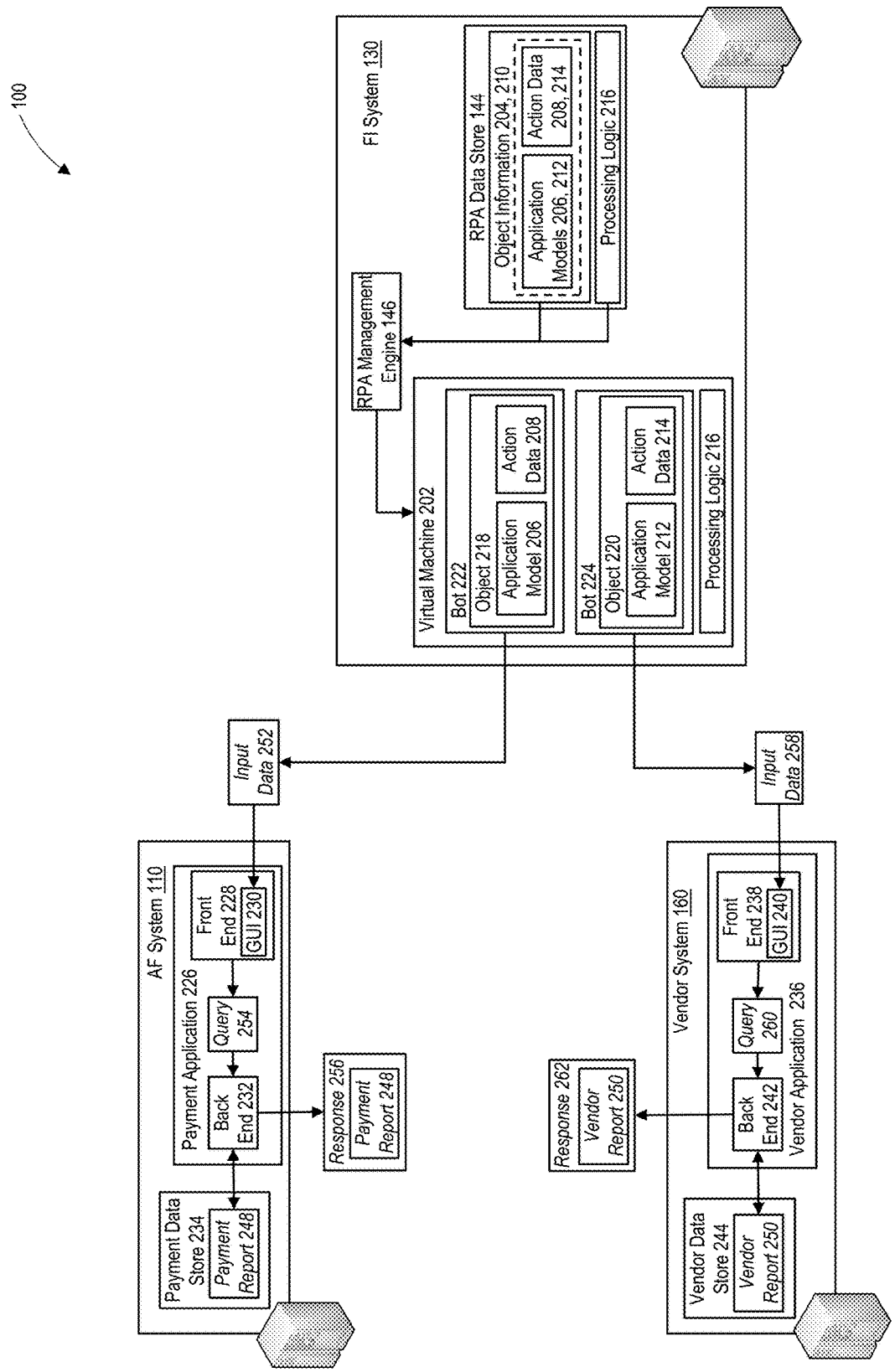

This specification relates to computer-implemented processes that, among other things, manage reporting and reconciliation workflow through virtualization of robotic process automation (RPA) techniques. By way of example, modern financial institutions provision a variety of financial products to their customers, either through in-person, branch-based appointments or through one or more digital channels. As described herein, the provisioned financial products may include one or more secured credit products, such as, but not limited to, an automotive loan (e.g., an "auto" loan) issued by a financial institution to a particular customer, and the auto loan may fund a purchase of an automobile by the particular customer. In some instances, the auto loan may be associated with terms and conditions that, among other things, specify a temporal period of redemption (e.g., a "redemption period") for the auto loan, and the terms and conditions may obligate the customer to submit, to the financial institution during the redemption period, payments of an amount and frequency established by a corresponding repayment schedule.

During the redemption period, the particular customer may access a digital portal associated with the financial institution (e.g., a web page presented by a web browser executed at a customer device, a digital interface provisioned by a mobile banking application executed at the customer device, etc.), and may provide input to the customer device that initiates a payment on an outstanding balance of the auto loan in accordance with the repayment schedule. In some instances, the particular customer may elect to fund the initiated payment using an account (e.g., a checking, savings, or other deposit account, etc.) issued by an additional financial institution different from, and unrelated to, the financial institution that provisioned the auto loan, and while a computing system of the financial institution may generate and store elements of account data noting the payment upon initiation by the customer, the financial institution may be incapable of reconciling the initiated payment against the outstanding balance of the auto loan, and reducing the outstanding balance of the auto loan to reflect the initiated payment, prior to a clearance and settlement of the initiated payment. For example, the financial institution may lack certainty that the account issued by additional financial institution holds funds sufficient for the initiated payment and as such, that the additional financial institution will not return the initiated payment due to insufficient funds (e.g., "NSF"), until completion of the clearance and settlement process.

In some instances, and to reconcile the auto-loan payments initiated during a prior business day against the outstanding balances of corresponding ones of the auto loans, a representative of the financial institution may, at a predetermined time on each business day (e.g., at or prior to 9:00 a.m. on each business day), and using a corresponding terminal device, access manually (i) a payment report generated by the financial institution that identifies and characterizes each of the auto-loan payments initiated during the prior business day and the customers that initiated the auto-loan payments, and (ii) a vendor report generated by an unrelated, third-party vendor that identifies the auto-loan payments initiated on the prior business day and that characterize a current status of each of the initiated auto-loan payments (e.g., cleared and settled, returned for NSF, etc.). Based on the accessed payment and vendor reports, the representative may confirm manually a status of each of the auto-loan payments initiated during the prior business day, and may populate manually one or more fields of a reconciliation report that identifies each of the initiated auto-loan payments and the corresponding payment status, and that characterizes an impact of the initiated auto-loan payments on an outstanding balance of the corresponding auto loan.

By way of example, the representative may access, via a web browser executed by a corresponding terminal device, web pages, graphical user interfaces (GUIs), or other digital portals associated with various data repositories maintained by the financial institution and with the third-party vendor. Upon provisioning of one or more authentication credentials to the accessed web page, GUI, or digital portal of the financial institution, the representative may request, and receive at the terminal device, a copy of the payment report from a computing system associated with the financial institution (e.g., a "FI" computing system). Upon provisioning of one or more additional authentication credentials to the accessed web page, GUI, or digital portal of the of the third-party vendor, the representative may request, and receive at the terminal device, a copy of the payment report from a computing system associated with the third-party vendor (e.g., a "vendor" computing system). The terminal device may, for example, store the received payment and vendor reports in a corresponding data repository (e.g., within a tangible, non-transitory memory), and the payment and vendor reports may be formatted in accordance with one or more structured or unstructured formats, such as, but not limited to, as an unstructured text file, a delimited text file (e.g., a commas-separated values (CSV) file), an Extended Markup Language (XML) file, or as a file formatted for consistent with one or more application programs (e.g., an Excel™ file, and PDF document, etc.).

Further, and via one or more application programs executed by the terminal device, the representative may access one or more elements of the payment report that characterizes a particular one of the auto-loan payments initiated during the prior business day (one or more rows of the structured payment report characterizing the particular auto-loan payment). The accessed elements of the payment report may include, among other things, a unique identifier of the particular auto-loan payment (e.g., an alphanumeric character string assigned to the particular auto-loan payment by the financial institution), and based on the identifier, the representative may, via the one or more executed application programs, access and parse elements of the vendor to identify a corresponding one of the elements that characterize the current status of the particular auto-loan payment, e.g., settled and cleared or returned for NSF. In some instances, and based on input provided to the terminal device, the representative may copy data that identifies the particular auto-loan payment (e.g., the unique identifier, the payment amount, the customer account that funds the payment, etc.), the particular auto loan (e.g., a loan account number, an issuing branch of the financial institution, etc.), and the corresponding customer (e.g., a customer name, a customer identifier, such as an alphanumeric login credential, etc.) from the payment report, and paste the copied data into corresponding portion of the reconciliation report (e.g., into a corresponding row of the reconciliation report).

Based on additional input provided to the terminal device, the representative may copy data characterizing the current state of the auto-loan payment (e.g., cleared and settled, or returned for NSF, etc.) from the accessed vendor report, and paste the copied data into the portion of the reconciliation report associated with the particular auto-loan payment. In some instances, if the vendor report were to indicate a successful clearance and settlement of the particular auto-loan payment, the representative may, via the one or more executed application programs, enter, manually, comment data into the reconciliation report that confirms an impact of the cleared and settled payment on the outstanding balance of the auto loan (e.g., an updated balance that reflects the payment). Alternatively, if the vendor report were to indicate a return of the particular auto-loan payment for insufficient funds (e.g., returned for NSF), the representative may, via the one or more executed application programs, enter, manually, additional comment data into the reconciliation report that confirms the outstanding balance of the auto loan no longer reflects the returned payment and further, that identifies any penalty imposed on the customer due to the returned payment (e.g., based on terms and conditions of the auto loan or characteristics of the customer, such as the customer's state or province of residence).

These manual reconciliation processes may be performed repeatedly by the representative, on a line-by-line basis, to generate elements of the reconciliation report that identify and characterize each additional, or alternate, one of the auto-loan payments initiated during the prior business data and specified within the accessed payment reporting. Further, and upon generation of the elements of the reconciliation report data that reconcile each of the auto-loan payments initiated during the prior business day (e.g., based on the vendor report and the payment report), and based on additional representative input, the terminal device may transmit the now-completed reconciliation report across a corresponding communications network to one or more computing systems associated with the financial institution. In some instances, the one or more computing systems associated with the financial institution may process the reconciliation report and perform operations that update one or more structured or unstructured data records (e.g., that maintain customer account balances, daily sales reports, financial reports, etc.) to reflect the now-reconciled auto-loan payments.

In addition to the manual reconciliation processes described herein, the representative may perform further manual processes to compile, update, and distribute, on a daily basis (e.g., at or near a close-of-business), a sales, proceeds and redemptions (SPR) report that identifies and characterizes the auto loans under redemption at or redeemed by the financial institution during a current business, and further, that characterizes the auto loans sold by the financial institution to unrelated, third-party loan servicers during the prior business day. By way of example, and for a particular auto loan issued by the financial institution, the SPR report may include, among other things, information that identifies the particular auto loan (e.g., a loan account number, an issuing branch of the financial institution, etc.) and a customer that holds the auto loan (e.g., a customer name, a customer identifier, such an alphanumeric login credential, etc.). Further, and for the particular auto loan, the SPR report may also include information that characterizes the current status of the particular auto loan (e.g., information indicating that the particular auto loan is held by the financial institution and under redemption during the current business day, that the financial institution elected to sell the particular auto loan to an unrelated, third-party loan servicer during the current business day, or that the financial institution redeemed fully the particular auto loan during the current business day), along with an amount of the proceeds derived from the redemption or sale of the particular auto loan and received by the financial institution during the prior business day.

For example, the representative may access, via the web browser executed by the terminal device, a web page, GUI, or other digital portal associated with the financial institution, and upon provisioning one or more authentication to the accessed web page, GUI, or digital portal, the representative may request, and receive at the terminal device, an existing copy of the SPR report from the computing system of the financial institution (e.g., as complied, updated, and distributed by the representative on the prior business day, etc.). Further, the representative may also access, via the executed web browser, an additional web page, GUI, or other digital portal associated with the data repositories maintained by the financial institution, and upon provisioning one or more authentication credentials to the accessed additional web page, GUI, or digital portal, the representative may request, and receive at the terminal device, elements of proceeds data that identify and characterize one or more auto loans under redemption at, sold by, or fully redeemed by the financial institution during a current business day. The terminal device may store the received copy of the sales, proceeds and redemptions report and the received payment data in a corresponding data repository (e.g., within a tangible, non-transitory memory).

The representative of the financial institution may access, via one or more application programs executed by the terminal device, an element of the stored proceeds data that characterizes a sale, or redemption, of a corresponding one of the auto loans held by the financial institution during the current business day. Further, via the one or more executed application programs, the representative may access the stored copy of the SPR report, and based on input provided to the terminal device, the representative may copy and paste portions of the data characterizing the sale or redemption of the corresponding auto loan into a portion of the accessed copy of the sales, proceeds and redemptions report. Based on additional input provided to the terminal device, the representative may format the newly copied and pasted data (e.g., in accordance with a scheme or format of the sales, proceeds and redemptions report), and may enter, manually, comments that characterize the current status of the corresponding auto loan.

These compilation and update processes may be performed repeatedly by the representative, manually on a line-by-line basis, to generate additional elements of the SPR report that characterize each of the additional, or alternate, auto loans under redemption at, sold by, or redeemed fully by the financial institution during the current business day (e.g., as identified by the elements of the proceeds data). Further, and upon completion of these manual compilation and update processes, and based on additional representative input, the terminal device may transmit the updated copy of the sales, proceeds and redemptions report across a corresponding communications network to one or more computing systems associated with the financial institution.

While the operations performed manually by representatives of the financial institution may facilitate a daily reconciliation of auto-loan payments initiated during a prior business day against outstanding balances of corresponding ones of the auto loans issued by the financial institution, and daily reporting of the SPR report, the volume of auto loans issued by the financial institution may cause the representatives of the financial institution to repeat the manual performance of these operations thousands of times on a daily basis, e.g., prior to and upon close-of business. Further, and in addition to consuming significant amounts of the representatives' workdays, these manually implemented operations may also result in wide, but unintended, distribution of confidential customer data throughout the financial institution, which may increase a likelihood of a misuse or an unauthorized distribution of that confidential customer information.

As described herein, one or more of these operations may enable the representative of the financial institution to access manually a payment report, elements of proceeds data, and a SPR report maintained in one or more data repositories of the computing system of the financial institution via GUIs or digital portals maintained by the payment computing system, and to access manually a vendor report maintained in a data repository of the vendor computing system via GUIs or digital portal maintained by the vendor computing system. Further, and by way of example, the terminal device may, upon execution of one or more application programs, perform operations that establish a secure channel of communications with each of the data repositories of the computing systems of the financial institution and the vendor via repository-specific programmatic interfaces, such as, but not limited to, application programming interfaces (API). In some instances, the one or more executed applications may cause the terminal device to obtain programmatically one or more of payment report, elements of proceeds data, and a SPR report from the data repositories of the computing system of the financial institution via corresponding ones of the APIs, and additionally, or alternatively, to obtain programmatically the vendor report from the data repository of the vendor computing system via the corresponding API.

To facilitate the implementation of these programmatic operations by the application programs executed at the terminal device, the computing systems of the financial institution and the vendor may perform operations that publicize, or render accessible, data characterizing corresponding ones of the repository-specific programmatic interfaces, such as, but not limited to, data identifying a composition or format of input to a corresponding API, or data identifying a structure and format of an expected output of that corresponding API. In some instances, the exposure of these programmatic interfaces by the payment computing system or the vendor computing system may establish a direct, and potentially more damaging, level of access to the functionalities of these programmatic interfaces, and may increase a likelihood of attacks on the confidential, customer-specific data by malicious third parties (e.g., ransomware attacks, etc.) when compared to the operations that access the confidential, customer-specific data maintained by the data repositories with corresponding GUIs or digital portals.

Certain of the exemplary processes described herein may virtualize and automate one or more of the operations performed manually by the representatives of the financial institution through an instantiation of one or more virtual machines at a computing system of the financial institution and through an implementation, by each of the instantiated virtual machines, of robotic process automation (RPA) techniques. By way of example, and as described herein, these RPA techniques, when implemented by each of the instantiated virtual machines, may enable each of these virtual machines to execute one or more software robots (e.g., "bots") that, among other things, access a graphical user interface (GUI) or other digital portal of one or more computing systems of the financial institution or the third-party vendor based on a corresponding application model (e.g., that establishes the structure, layout, or input format associated with interface elements disposed across various display screens of the GUI or digital portal) and corresponding elements of processing logic (e.g., that establishes and specifies points of interaction between the corresponding bots and the interface elements of the GUI or digital portal).

Through an implementation of these RPA techniques, the bots executed by one or more of the instantiated virtual machines may access the GUIs or digital portals of the computing systems of the financial institution and the third-party vendor, and perform any of the exemplary processes described herein, consistent with the elements of processing logic, to obtain the payment report, the elements of proceeds data, or the SPR report maintained in the data repositories of the computing system of the financial institution, or the vendor report maintained in the data repositories of the vendor computing system. Furthermore, through an implementation of these RPA techniques, the bots executed by one or more of the instantiated virtual machines may also perform any of the exemplary processes described herein, in accordance with the elements of processing logic, to reconcile, on a daily basis, auto-loan payments initiated by customers of the financial institution during a prior business day against outstanding balances of corresponding auto loans issued by the financial institution, and to compile, update, and distribute, on a daily basis, an updated SPR report that reflects the auto loans under redemption at, sold by, or redeemed fully by the financial institution during a current business day.

In some instances, the processing logic associated with the GUI or digital portal of each data repository may incorporate a subset of those operations performed manually by representatives of the financial institution when accessing the corresponding GUI or digital portal, reconciling the auto-loan payments on a daily basis, or compiling, updating, and distributing the updated SPR report, such as, but not limited to, a streamlined, optimized, or aggregated subset of the manually performed operations. As such, when the "bot" executed by an instantiated virtual machine accesses programmatically the GUI or digital portal of a data repository based on the corresponding processing logic, the executed bot may obtain the payment report, the elements of payment data, or the SPR report maintained in the data repositories of the computing system of the financial institution, or the vendor report maintained in the data repositories of the vendor computing system, may reconcile the auto-loan payment, and/or compile, update, and distribute, on a daily basis, a SPR report using fewer discrete interactions with the interface elements of the GUI or digital portal, and fewer corresponding computational operations, than would be required for a corresponding manual implementation.

Furthermore, as certain of the exemplary processes described herein enable each of the instantiated virtual machines to access programmatically one or more of the data repositories of the computing systems of the vendor or the financial institution through a corresponding GUI or digital portal in accordance with respective application models and elements of processing logic, these exemplary processes may reduce a likelihood of attacks by malicious third parties, and increase a security and confidentiality of the underlying elements of confidential data maintained within payment report, the elements of payment data, the SPR report, and/or the vendor report, when compared to conventional processes that rely on exposed programmatic interfaces. Thus, certain of these exemplary processes may be implemented in addition to, or as an alternative to, conventional automated processes that access elements of customer-specific data programmatically through corresponding APIs.

A. Exemplary Computing Environments

FIG. 1 is a diagram of an exemplary computing environment 100, consistent with certain disclosed embodiments. For example, as illustrated in FIG. 1, environment 100 may include one or more computing systems associated with or operated by a financial institution, such as an auto-finance (AF) system 110 and a financial institution (FI) system 130. In some instances, AF system 110 may be associated with a particular unit or division of the financial institution, such as an auto-finance division, that, among other things, issues secured automotive loans (e.g., "auto" loans) to corresponding customers, receives payments on outstanding balances on the auto loans during corresponding redemption periods, and manages sales of one or more of the auto loans to unrelated, third-party loan servicers, and tracks proceeds derived from redemptions of sales of these auto loans. Further, as illustrated in FIG. 1, environment 100 may also include one or more additional computing systems, such as a vendor computing system 160 associated with, or operated by, a third-party vendor that, among other things, tracks a status of one or more initiated auto-loan payments within a corresponding clearance and settlement process.

As illustrated in FIG. 1, each of AF system 110, FI computing system 130, and vendor system 160 may be interconnected through one or more communications networks, such as communications network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems operating within environment 100 may perform operations that establish and maintain one or more secure channels of communication across network 120, such as, but not limited to, a transport layer security (TSL) channel, a secure socket layer (SSL) channel, or any other suitable secure communication channel.

Further, each of AF system 110, FI computing system 130, and vendor system 160 may represent a computing system that includes one or more servers and tangible, non-transitory memory devices storing executable code and application modules. The one or more servers may each include one or more processors or processor-based computing devices, which may be configured to execute portions of the stored code or application modules to perform operations consistent with the disclosed embodiments. For example, FI computing system 130 may include one or more servers 132 configured to execute portions of the stored code or application modules (e.g., as maintained within one or more tangible, non-transitory memories 134) and perform any of the exemplary processes described herein to manage report reconciliation workflow using robotic process automation. Further, although not illustrated in FIG. 1, each of AF system 110, FI computing system 130, and vendor system 160 may include a communications unit or interface coupled to corresponding one of the one or more processors for accommodating wired or wireless communication across network 120 with any of the additional network-connected systems or devices described herein, e.g., a transceiver device.

In some instances, one or more of AF system 110, FI computing system 130, and vendor system 160 may correspond to a single, discrete computing system operating within environment 100. In other instances, the functionalities of AF system 110, FI computing system 130, and vendor system 160 may be performed by a combination of discrete computing systems operating within environment 100. For example, one or more of AF system 110, FI computing system 130, and vendor system 160 may correspond to a distributed system that includes computing components distributed across one or more networks, such as network 120, or other networks, such as those provided or maintained by cloud-service providers (e.g., Google Cloud™ Microsoft Azure™, etc.).

Further, although not illustrated in FIG. 1, each of AF system 110 and vendor system 160 may execute one or more application programs, and may maintain elements of confidential data (e.g., such as, but not limited to, one or more of the payment reports, the elements of proceeds data, the SPR reports, or the vendor reports described herein). In some examples, each of the executed application programs may include an application front end exposed to one or more computing devices or systems across network 120 (such as, but not limited to, FI computing system 130) via a corresponding graphical user interface (GUI) or digital portal, and an application back end. As described herein, the application back end may access the elements of confidential data maintained within corresponding ones of the data repositories (e.g., based on commands generated by the application front end in response to interaction with the corresponding GUI or digital portal), and may route accessed elements of the confidential data back to the application front end (e.g., for presentation within the corresponding GUI or digital portal or for provisioning to the requesting computing system or device).

To perform any of the exemplary processes described herein, FI computing system 130 may maintain, within one or more of tangible, non-transitory memories 134, a data repository 136 that includes an payment data store 138, a vendor data store 140, a template data store 142, and a robotic process automation (RPA) data store 144. For example, payment data store 138 may include, among other things: (i) one or more payment reports that identify and characterize auto-loan payments initiated by customers of the financial institution during one or more prior temporal intervals; (ii) one or more reconciliation reports that reconcile initiated, and cleared and settled or returned, auto-loan payments against outstanding balances on corresponding ones of the auto loans; and (iii) one or more SPR reports that identify and characterize auto loans under redemption at the financial institution, or sold by the financial institution to unrelated, third-party loan servicers, during various temporal intervals, and proceeds derived from these redemptions or sales. In some instances, FI computing system 130 may obtain at least a portion of the information maintained within payment data store 138 (e.g., one or more of the payment reports or the SPR reports) from AF system 110 through a visualized implementation of any of the exemplary RPA processes described herein. In other examples, FI computing system 130 may perform any of the exemplary processes described herein to generate additional, or alternate portions of the information maintained within payment data store 138 (e.g., the reconciliation reports or one or more of the sales, proceeds and redemptions reports).

Vendor data store 140 may include one or more vendor reports, each of which identify one or more auto-loan payments initiated by customers of the financial institution during a prior temporal interval and characterize a current status of each of the initiated auto-loan payments, such as, but not limited to, successfully cleared and settled or returned for insufficient funds (NSF). By way of example, FI computing system 130 may obtain each of the vendor reports maintained within vendor data store 140 from vendor system 160 through a visualized implementation of any of the exemplary RPA processes described herein. Further, in some instances, template data store 142 may include template or schema data identifying and characterizing a structure, format, or content of one or more of the reconciliation reports or the sales, proceeds, and redemption reports described herein, e.g., as maintained within payment data store 138. In some instances, each of the elements of template or schema data may be associated with a corresponding one of the report types, e.g., the reconciliation report or the SPR report, and the elements of template or schema data may include an identifier of the corresponding report type.

RPA data store 144 may include elements of data that facilitate an execution of one or more software robots (e.g., "bots") by one or more virtual machines instantiated at FI computing system 130, e.g., by executed RPA management engine 146 using any of the exemplary processes described herein. Each of the executed bots may, for example, include one or more objects and elements of processing logic that encode sequential operations performed by corresponding ones of the objects. In some instances, one or more of the objects may be configured by the elements of the processing logic to interact with a corresponding one of the application programs executed by AF system 110 and vendor system 160, and to perform actions or operations specified by the elements of processing logic, such as, but not limited to, logging into the corresponding GUI or digital portal, requesting and retrieving elements of the confidential data maintained within corresponding ones of the data repositories of AF system 110 and vendor system 160, and logging out of the corresponding GUI or digital portal. Further, the objects may include, and may be defined by, corresponding application models and corresponding elements of action data. By way of example, and for a particular one of the objects, the application model may expose that object the application program executed by one of AF system 110 or vendor system 160, and may identify and characterize interface elements displayed within one or more display screens of the corresponding GUI or digital portal (e.g., a type of interface element, an appropriate format or structure of input data, etc.). Further, and for the particular data object, the elements of action data may identify those discrete or sequential actions that the object can perform during interaction with the application program and in accordance with the application model.

Referring back to FIG. 1, and to facilitate the performance of the exemplary RPA techniques described herein, RPA data store 144 may maintain, within structured or unstructured data records, one or more elements of the processing logic, one or more of the application models, and corresponding elements of action data that, when provisioned or rendered accessible to the instantiated virtual machines, facilitates the execution of corresponding ones of the bots and the specified interaction between these bots and the application programs executed at each of AF system 110 and vendor system 160, e.g., in accordance with the elements of processing logic. Further, although not illustrated in FIG. 1, RPA data store 144 may also maintain, within the structured or unstructured data records, information associated with one or more tools (e.g., bot development tools, bot management tools, etc.), libraries, and runtime environments for programmatic bots executed by the instantiated virtual machines.

In some instances, the elements of processing logic may encode programmatically generated sets of sequential operations that, when implemented by the executed programmatic bots, enable the executed programmatic bots to access corresponding ones of the application programs executed at AF system 110 and/or vendor system 160, and to obtain elements of confidential data from data repositories maintained by corresponding ones of AF system 110 (e.g., the payment reports, the sales, proceeds, and redemption reports, or the elements of additional payment data described herein) and vendor system 160 (e.g., the vendor report described herein). As described herein, the executed programmatic bots (e.g., as configured by the elements of processing logic) may obtain these elements of confidential data from AF system 110 and vendor system 160 more efficiently and using fewer discrete operations when compared to manual interactions between representatives of the financial institution and graphical interfaces of the executed application programs.

Further, the elements of confidential customer data obtained through the exemplary, programmatic, RPA-based processes described herein may exhibit fewer errors and inconsistencies than comparable elements of confidential customer data obtained through these manual operations (e.g., due to a reduction in keystroke errors, transposition errors, etc., by the representatives of the financial institution during interaction with the graphical interfaces of the executed application programs). Additionally, in some instances, certain of these exemplary processes, when implemented through the executed programmatic bots, may reduce instances of unauthorized access, misuse, or distribution of the confidential customer data (e.g., as these exemplary processes limit a number of the representatives of the financial institution capable of accessing the confidential customer data), and may increase a security of the confidential customer data maintained at AF system 110 and vendor system 160 (e.g., as these exemplary processes provision access to the confidential customer data through graphical interfaces without exposing corresponding programmatic interfaces to computing systems or devices within environment 100).

The elements of processing logic may also encode additional, or alternate, programmatically generated sets of sequential operations that, when implemented by the executed programmatic bots, enable the executed programmatic bots to reconcile, on a daily basis, auto-loan payments initiated by customers of the financial institution during a prior business day against outstanding balances of corresponding auto loans issued by the financial institution, and to compile, update, and distribute, on a daily basis, a SPR report that identifies and characterizes the auto loans under redemption at, or sold by, the financial institution during a current business day. For example, as illustrated in FIG. 1, the programmatically generated sets of sequential operations may establish, among other things, a reconciliation engine that, when implemented by the executed programmatic bots, causes the executed programmatic bots to perform any of the exemplary processes described herein that reconcile the initiated auto-loan payments based on elements of the payment report obtained from AF system 110 and the vendor report obtained from vendor system 160, and that generate a corresponding reconciliation report. Further, the programmatically generated sets of sequential operations may establish, among other things, a SPR engine, when implemented by the executed programmatic bots, causes the executed programmatic bots to perform any of the exemplary processes described herein that compile, update, and distribute an updated SPR report based on an existing copy of the SPR report and proceeds data maintained at AF system 110.

Although not illustrated in FIG. 1, RPA data store 144 may also maintain, within the structured or unstructured data records, elements of session data that characterize a performance of each of the virtual machines instantiated by FI computing system 130 and additionally, or alternatively, the sequential operations performed by each of the programmatic bots executed by the instantiated virtual machines, e.g., through the performance of the exemplary RPA-based processed described herein. In some instances, the elements of session data maintained within RPA data store 144 may enable one or more applications executed by FI computing system 130 to monitor, and adaptively adjust, the subset of the queued and prioritized elements of payment and/or vendor data allocated to each of the instantiated virtual machines.

Referring back to FIG. 1, FI computing system 130 may also maintain, within one or more of tangible, non-transitory memories 134, one or more executable application programs, such as, but not limited to, a robotic process automation (RPA) management engine 146. When executed by the one or more processors of FI computing system 130, RPA management engine 146 may perform operations that instantiate and/or clone one or more virtual machines executable by FI computing system 130 and provision, to the instantiated or cloned virtual machines, corresponding ones of the application models and the elements of action data (e.g., as object information), which establish respective ones of the programmatic bots executable by the virtual machines, and the corresponding elements of processing logic, which establish the sequential operations performed by each of the executed programmatic bots.

For example, and upon execution by the one or more processors of FI computing system 130, RPA management engine 146 may perform operations consistent with a virtual machine manager (VMM) or hypervisor that, among other things, provides each of the instantiated virtual machines with a virtual operating platform and manages the execution of the programmatic bots by these virtual machines using the virtual operating platform and in accordance with the corresponding elements of the processing logic. Further, executed RPA management engine 146 may also perform operations that monitor a performance and operation of each of the instantiated virtual machines and additionally, or alternatively, each of the execution of programmatic bots, and that store corresponding elements of session data indicative of the monitored performance and operation within RPA data store 144.

B. Exemplary Processes for Managing Reconciliation Workflow using Robotic Process Automation As described herein, a financial institution, such as the financial institution associated with FI computing system 130 may maintain financial units for providing secured or unsecured credit products to its customers, and the financial institution may, during a corresponding temporal interval (e.g., a business day), receive payments from its customers related to existing or new obligations associated with these secured or unsecured credit products. For example, and as described herein, an auto-financing unit or division of the financial institution may provision auto loans to corresponding customers, and the provisioned auto loans may funds all or a portion of a purchase of an automobile by corresponding ones of the customers and may be secured against corresponding ones of these purchased automobiles. Further, each of the provisioned auto loans may be associated with a corresponding set of terms and conditions, which establish a redemption period for each of the provisioned auto loans, and the terms and conditions of each of the provisioned auto loans may obligate the corresponding customer to submit, to the financial institution during the redemption period, payments of an amount and frequency established by a corresponding repayment schedule.

For example, and during the redemption period associated with each of the provisioned auto loans, the corresponding customer may access a digital portal of the financial institution (e.g., via on or more application programs executed by a computing device or system, such as a smart phone or tablet computer), and may provide input to the computing device or system that initiates the scheduled auto-loan payment. In some instances, and based on the provisioned input, the one or more executed application programs (e.g., a mobile application of the financial institution, etc.) may generate elements of a payment request associated with the initiated auto-loan payment, and perform operations that cause the computing system or device to transmit the payment request across a communication network, such as network 120 of FIG. 1, to a computing system associated with the financial institution, such as AF system 110. In other instances, the payment request may be generated, and transmitted to AF system 110, by a computing terminal device operated by a representative of the financial institution (e.g., based on a telephone-based payment received from the customer at a call center, or based on an in-person payment delivered at a physical branch of the financial institution), or based on information obtained from an ongoing messaging session with the customer (e.g., a session involving a programmatic chatbot or an employee of the financial institution).

The payment request associated with each of the initiated auto-loan payments may, for example, include a unique identifier of the auto-loan payment (e.g., an alphanumeric character string assigned to the particular auto-loan payment by the financial institution, a unique identifier of a customer associated with the auto-loan payment (e.g., a customer name or a unique alphanumeric identifier assigned to the customer by the financial institution, such as an alphanumeric access or login credential), payment data that identifies and characterizes the auto-loan payment (e.g., a payment amount, or a payment date, etc.), and account data that identifies and characterizes a payment instrument selected by the corresponding customer to fund the auto-loan payment (e.g., a payment type, an account number, a bank routing number, etc.). In some instances, each of the payment requests may also include a digital token, cryptogram, hash value, or other element of cryptographic data, which may uniquely identify the computing system or device of the corresponding customer (or the executed application program, such as the mobile banking application), and which may enable AF system 110 or FI computing system 130 to verify an identity of the corresponding customer or an integrity of each of the payment requests.

Upon receipt of each of the payment requests, AF system 110 may perform operations that verify the identity of the corresponding customer and/or the integrity of the payment request (e.g., based on the digital token, cryptogram, hash value, or other element of cryptographic data), and that confirm receipt of the payment request (e.g., by transmitting a confirmation to the computing system or device of the corresponding customer). Further, in some example, AF system 110 may also perform operations that, for each of the payment requests received during a corresponding temporal interval (e.g., a business day of the financial institution), populate a corresponding data record of a payment report with the unique identifier of the corresponding auto-loan payment, the unique identifier of the corresponding customer, and portions of the payment and account data associated with the corresponding auto-loan payment. In some instances, the payment report may also include temporal data characterizing the temporal interval (e.g., a calendar date), and upon expiration of the temporal interval, AF system 110 may perform operations that store the payment report within a data repository maintained within a tangible, non-transitory memory, e.g., in conjunction with additional payment reports generated during prior temporal intervals.

AF system 110 may also perform operations that package each of the received payment requests into a corresponding payment message structured in accordance with one or more payment networks or payment rails, such as a payment network associated with an automated clearing house. On a message-by-message basis, or in batch mode consistent with a predetermined schedule, AF system 110 may broadcast the payment messages across network 120 to one or more computing systems associated with the payment networks or payment rails, which may perform operations that clear and settle each of the initiated auto-loan payments in conjunction with the financial institution that issue the payment instruments selected to fund each of the auto-loan payments. As described herein, a customer of the financial institution may elect to fund a corresponding one of the initiated auto-loan payments using an account, such as a personal checking account, issued by the financial institution, although in other instances, one or more of the customers may elect to fund one of the initiated auto-loan payments using an account issued by an additional, unrelated financial institution.

Due to a lack of certainty regarding the status of the accounts issued by these additional, unrelated financial institutions, the financial institution may be incapable of reconciling the initiated auto-loan payments funded using the accounts issued by the additional, unrelated financial institutions, against the outstanding balance of corresponding auto loans prior to a clearance and settlement of the initiated payment. In some examples, a computing system associated with the financial institution, such as FI computing system 130, may perform any of the exemplary processes described herein to instantiate one or more virtual machines, and through a virtualized implementation of robotic process automation (RPA) techniques by these virtual machines, to reconcile, on a daily basis, auto-loan payments initiated by customers of the financial institution during a prior business day against outstanding balances of corresponding auto loans issued by the financial institution based on the elements of a payment report generated by AF system 110 during the prior business day and elements of a vendor report compiled and maintained by vendor system 160. As described herein, the elements of the vendor report may identify each the auto-loan payments initiated on the prior business day and that characterize a current status of each of the initiated auto-loan payment, e.g., cleared and settled, returned for insufficient funds (NSF), and the third-party vendor may be associated with, or operate in conjunction with, one or more of the payment networks or payment rails, such as the automated clearing house.

For example, FI computing system 130 may perform operations that instantiate or clone the one or more virtual machines, which may be provisioned with corresponding elements of object and action data and elements of processing logic that, collectively, enable these instantiated virtual machines to execute corresponding programmatic software robots (e.g., "bots). These executed programmatic "bots" may, for example, implement one or more exemplary robotic process automation (RPA) techniques that, as described herein, access graphical user interfaces (GUIs) or digital portals maintained by application programs executed by AF system 110 and vendor system 160, and request and receive the payment report and the vendor report from respective ones of AF system 110 and vendor system 160. Further, through an implementation of these RPA techniques, the bots executed by one or more of the instantiated virtual machines may also perform operation that, in accordance with the elements of processing logic, reconcile, on a daily basis, auto-loan payments initiated by customers of the financial institution during a prior business day against outstanding balances of corresponding auto loans issued by the financial institution.

In some instances, the virtualized implementation of these exemplary RPA techniques by FI computing system 130 may reduce the number of discrete interactions between computing systems of the financial institution and the GUIs or digital portals of AF system 110 and/or vendor system 160, and as such, the number of discrete computational operations by these computing systems, required to access and obtain the payment and vendor reports to reconcile the initiated auto-loan payments on a daily basis. Additionally, and as described herein, the virtualized implementation of these exemplary RPA techniques by FI computing system 130 may also reduce unauthorized access to, and distribution of, confidential customer information within the financial institution (e.g., due to a reduction in an exposure of this information among representatives of the financial institution), and further, may reduce a likelihood of attacks by malicious third parties on AF system 110 and vendor system 160, and increase a security and confidentiality of the underlying elements of customer information at AF system 110 and vendor system 160 (e.g., due to a reduction in an exposure of corresponding application programming interfaces across network 120).

Referring to FIG. 2A, the one or more processors of FI computing system 130 may execute RPA management engine 146, which may perform operations that instantiate (or clone) one or more virtual machines at FI computing system 130, and that manage an execution of each of the instantiated virtual machines. For example, executed RPA management engine 146 may perform operations that instantiate virtual machine 202, and additionally, or alternatively, may clone virtual machine 202 from one or more previously instantiated virtual machines (not illustrated in FIG. 2A). In other examples, also not illustrated in FIG. 2A, executed RPA management engine 146 may perform operations that instantiate and/or clone a plurality of virtual machines executing at FI computing system 130, including virtual machine 202. Further, each of the instantiated virtual machines may execute one or more programmatic software robots (e.g., programmatic "bots"), and the executed programmatic bots may be configured by the elements of processing logic to perform operations that, on a daily basis, obtain elements of the payment and vendor reports from respective ones of AF system 110 and vendor system 160, and reconcile the auto-loan payments initiated during a prior business day against outstanding balances of the corresponding auto loans based on the obtained elements of the payment and vendor reports.

Each of the executed programmatic bots may include, and may be established by, one or more corresponding executable objects, and the elements of processing logic may encode sequential operations performed by corresponding ones of the objects. Further, the executable objects may be configured by the elements of the processing logic to interact with one or more application programs executed by corresponding ones of AF system 110 and/or vendor system 160, and to perform actions or operations specified by the elements of processing logic, such as, but not limited to, logging into a GUI or digital portal, requesting and retrieving elements of the confidential customer data, and logging out of the corresponding GUI or digital portal. To facilitate such interaction, the executable objects may include, and may be defined by, corresponding application models and corresponding elements of action data. By way of example, and for a particular one of the executable objects, the application model may expose that object to the application program executed by vendor system 160, and may identify and characterize interface elements displayed within one or more display screens of the corresponding GUI or digital portal (e.g., a type of interface element, an appropriate format or structure of input data, etc.). Further, and for the particular executable object, the elements of action data may identify those discrete or sequential actions that the object can perform during interaction with the application program and in accordance with the application model.

For example, as illustrated in FIG. 2A, executed RPA management engine 146 may perform operations that access RPA data store 144 maintained within the one or more tangible, non-transitory memories of FI computing system 130, and that provision, to instantiated virtual machine 202, object information 204 (which includes application model 206 and action data 208) and object information 210 (which includes application model 212 and action data 214), along with the one or more elements of processing logic 216 described herein. In some instances, virtual machine 202 may process object information 204 and perform operations that generate executable object 218 based on application model 206 and action data 208, and that establish programmatic bot 222 that includes executable object 218. Further, virtual machine 202 may process object information 210 and perform operations that generate executable object 220 based on application model 212 and action data 214, and that establish programmatic bot 224 that includes executable object 220.

In some instances, application model 206 may expose executable object 218 to an application program executed by AF system 110, such as payment application 226. As illustrated in FIG. 2A, an application front-end 228 of executed payment application 226 may be exposed to FI computing system 130 via a corresponding GUI, such as a GUI 230, and an application back-end 232 of executed payment application 226 may access corresponding elements of confidential data (e.g., as maintained within payment data store 234) based on commands generated by application front-end 228 in response to interaction with GUI 230. Further, application back-end 232 of executed payment application 226 may perform any of the exemplary processes described herein to selectively provision, or deny, requests to access the elements of confidential data (e.g., the payment reports described herein) received by application front-end 228, e.g., based on input to the interface elements of GUI 230.

Further, application model 212 may expose executable object 220 to an application program executed by vendor system 160, such as vendor application 236, and an application front-end 238 of executed vendor application 236 may be exposed to FI computing system 130 via a corresponding GUI, such as a 240. In some instances, application back-end 242 of executed application program 236 may access corresponding elements of confidential data (e.g., as maintained within vendor data store 244) based on commands generated by application front-end 238 in response to interaction with GUI 240, and application back-end 242 may perform any of the exemplary processes described herein to selectively provision, or deny, requests to access to the elements of confidential data (e.g., the vendor reports described herein) received by application front-end 238, e.g., based on input to the interface elements of GUI 240. The disclosed embodiments are, however, not limited to the generation of bots 222 and 224 that include respective ones of executable objects 218 and 220. In additional examples, virtual machine 202 may perform any of the exemplary processes described herein to establish a single bot that includes both executable objects 218 and 220, or to generate any number of additional or alternate programmatic software robots that include, respectively, a selected one of executable objects 218 and 220, or alternatively, each of executable objects 218 and 220.

In some instances, executed RPA management engine 146 may also provision, to virtual machine 202, scheduling data that specifies a predetermined temporal schedule for initiating a performance of the exemplary, RPA-based reconciliation processes described herein by executed programmatic bots 222 and 224 in accordance with a predetermined schedule established by the financial institution, e.g., at a predetermined time on a daily basis, such as 9:00 a.m. The elements of processing logic 216 may also encode sequential operations that, when performed by executed programmatic bot 222 in accordance with the predetermined schedule (e.g., at 9:00 a.m. on a daily basis), cause executable object 218 to access GUI 230 of executed payment application 226, and to request and receive, via accessed GUI 230, one or more records of a payment report 248 maintained by AF system 110 within payment data store 234. Further, the elements of processing logic 216 may encode additional sequential operations that, when performed by executed programmatic bot 224 in accordance with the predetermined schedule (e.g., at 9:00 a.m. on a daily basis), cause executable object 220 to access GUI 240 of executed vendor application 236, and to request and receive, via accessed GUI 230, one or more records of a vendor report 250 maintained by vendor system 160 within vendor data store 244. As described herein, the records of payment report 248 may identify and characterize each of the auto-loan payments initiated during the prior business day and the customers that initiated the auto-loan payments, and the records of vendor report 250 may identify the auto-loan payments initiated on the prior business day and characterize a current status of each of the initiated auto-loan payments (e.g., cleared and settled, returned for NSF, etc.).

By way of example, and in accordance with the predetermined schedule on a particular business day (e.g., at 9:00 a.m. on Aug. 3, 2021), each of executed programmatic bots 222 and 224 may perform operations, consistent with the elements of processing logic 216, that establish communications with a respective one AF system 110 and vendor system 160 across network 120. Further, executed programmatic bot 222 may also may perform operations, consistent with the elements of processing logic 216, that cause executable object 218 to access GUI 230 of executed payment application 226, and executed programmatic bot 224 may perform similar operations, consistent with the elements of processing logic 216, that cause executable object 220 to access GUI 240 of executed vendor application 236. In some instances, not illustrated in FIG. 2A, executed programmatic bots 222 and 224 may perform any of the exemplary processes described herein to provision, to corresponding ones of GUIs 230 and 240, one or more elements of credential data associated with FI computing system 130.

Based upon a successful authentication of the elements of credential data by payment application 226, executed programmatic bot 222 may perform any of the exemplary processes described herein to provide, as input to GUI 230, information that requests a payment report identifying and characterizing auto-loan payments initiated by customers of the financial institution on a prior business day, e.g., on Aug. 2, 2021. For example, as illustrated in FIG. 2A, executed programmatic bot 222 may generate input data 252 that includes an identifier of the requested payment report, temporal data specifying the prior business day (e.g., Aug. 2, 2021), and in some instances, an identifier of the financial institution (e.g., a cryptogram, hash value, or digital token, etc.), and FI computing system 130 may transmit input data 252 across network 120 to AF system 110, e.g., as additional input to GUI 230. In some instances, a format or structure of each of the identifiers and the temporal data may be consistent with application model 206, which identifies and characterizes the interface elements displayed within one or more display screens of GUI 230, and/or action data 208, which specifies one or more actions capable of performance by executable object 218 during interaction with GUI 230.

AF system 110 may receive input data 252, and application front-end 228 of executed payment application 226 may process input data 252 provisioned to GUI 230, and may generate a corresponding query 254 for the requested payment report generated on Aug. 2, 2021, and maintained at AF system 110. Query 254 may, for example, include the identifier of the payment report and the temporal data specifying the requested August $2^{nd}$ date, and application front-end 228 may provide query 254 as an input to application back-end 232 of executed payment application 226. Application back-end 232 may perform operations that access a local data repository maintained within a tangible, non-transitory memory, e.g., payment data store 234 of FIG. 2A, and based on query 254, application back-end 232 may access and obtain records of payment report 248 from payment data store 234. The obtained records of payment report 248 may identify and characterize each of the auto-loan payments initiated on Aug. 2, 2021, and the customers that initiated the auto-loan payments, and application back-end 232 may perform operations that encrypt the records of payment report 248 using, for example, a public cryptographic key associated with, or generated by, FI computing system 130. Application back-end 232 may also perform operations that generate a response to query 254, e.g., response 256, and package the encrypted records of payment report 248 into a corresponding portion of response 256. Application back-end 232 may perform additional operations that cause AF system 110 to transmit response 256 across network 120 to FI computing system 130.

Further, and based upon a successful authentication of the elements of credential data by vendor application 236, executed programmatic bot 224 may perform any of the exemplary processes described herein to provide, as input to GUI 240, information that requests a vendor report identifying the auto-loan payments initiated on Aug. 2, 2021 (e.g., the prior business day) and that characterize a current status of each of the initiated auto-loan payment, e.g., cleared and settled, returned for NSF. For example, executed programmatic bot 224 may generate input data 258 that includes an identifier of the requested vendor report, temporal data specifying the prior business day (e.g., Aug. 2, 2021), and in some instances, an identifier of the financial institution (e.g., a cryptogram, hash value, or digital token, etc.), and FI computing system 130 may transmit input data 258 across network 120 to vendor system 160, e.g., as additional input to GUI 240. In some instances, a format or structure of each of the identifiers and the temporal data may be consistent with application model 212, which identifies and characterizes the interface elements displayed within one or more display screens of GUI 240, and/or action data 214, which specifies one or more actions capable of performance by executable object 220 during interaction with GUI 240.

Vendor system 160 may receive input data 258, and application front-end 238 of executed vendor application 236 may process input data 258 provisioned to GUI 240, and may generate a corresponding query 260 for the requested vendor report and maintained at vendor system 160. Query 260 may, for example, include the identifier of the vendor report and the temporal data specifying the requested August $2^{nd}$ date, and application front-end 238 may provide query 260 as an input to application back-end 242 of executed vendor application 236. Application back-end 242 may perform operations that access a local data repository maintained within a tangible, non-transitory memory, e.g., vendor data store 244 of FIG. 2A, and based on query 260, application back-end 242 may access and obtain records of vendor report 250 from vendor data store 244. The obtained records of vendor report 250 may identify and characterize each of the auto-loan payments initiated on Aug. 2, 2021 (e.g., the prior business day) and that characterize a current status of each of the initiated auto-loan payments, and application back-end 242 may perform operations that encrypt the records of vendor report 250 using, for example, the public cryptographic key associated with, or generated by, FI computing system 130. Application back-end 242 may also perform operations that generate a response to query 260, e.g., response 262, and package the encrypted records of vendor report 250 into a corresponding portion of response 262. Application back-end 242 may perform additional operations that cause vendor system 160 to transmit response 262 across network 120 to FI computing system 130.

Figure 2B:
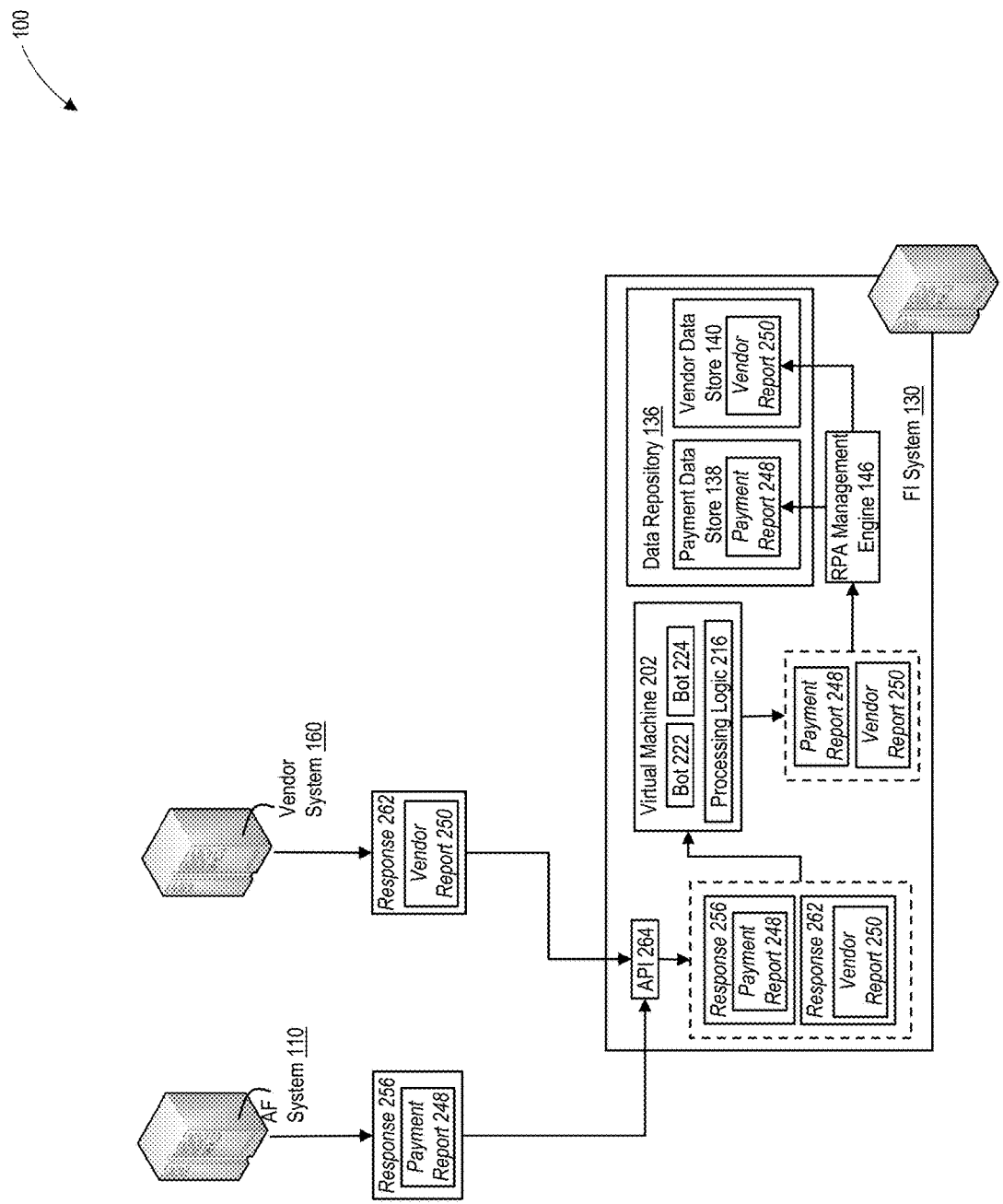

Referring to FIG. 2B, one or more programmatic interfaces established and maintained by FI computing system 130, such application programming interface (API) 264 associated with virtual machine 202, may receive response 256 (that includes the encrypted records of payment report 248) from AF system 110, may receive response 262 (that includes the encrypted records of vendor report 250) from vendor system 160, and may route responses 256 and 262 to executed virtual machine 202. In some instances, not illustrated in FIG. 2B, executed virtual machine 202 may perform operations that cause executed programmatic bot 222 to provide additional input data to AF system 110 that logs out of GUI 230, e.g., in accordance with application model 206 and processing logic 216, and that cause executed programmatic bot 224 to provide additional input data to vendor system 160 that logs out of GUI 240, e.g., in accordance with application model 212 and processing logic 216.

In some instances, virtual machine 202 may parse each of responses 256 and 262, and may perform operations that extract, from a respective one of responses 256 and 262, the encrypted records of payment report 248 and vendor report 250, which virtual machine 202 may provide as inputs to executed RPA management engine 146. Executed RPA management engine 146 may receive the encrypted records of payment report 248 and vendor report 250 from virtual machine 202, and in some instances, executed RPA management engine 146 may obtain, from data repository 136, a private cryptographic key associated with, or generated by, FI computing system 130. Using the private cryptographic key, executed RPA management engine 146 may decrypt the encrypted records of payment report 248 and vendor report 250, e.g., to yield decrypted records of payment report 248 and vendor report 250.

In some instances, executed RPA management engine 146 may perform operations that store the decrypted records of payment report 248 within corresponding portions of payment data store 138 of data repository 136, and that store the decrypted records of vendor report 250 within corresponding portions of vendor data store 140 of data repository 136. Further, although not illustrated in FIG. 2B, executed RPA management engine 146 may perform any of the exemplary processes described herein to generate one or more elements of session data, which may confirm the successful receipt of the records of payment report 248 and vendor report 250 from respective ones of AF system 110 and vendor system 160, and store the elements of session data within a portion of data repository 136.

As described herein, the elements of processing logic 216 provisioned to virtual machine 202 may also encode sequential operations that, when performed by executed programmatic bot 222 in accordance with the predetermined schedule (e.g., at 9:00 a.m. on a daily basis), cause executable object 218 to request and receive the records of payment report 248 from AF system 110, when performed by executed programmatic bot 224 in accordance with the predetermined schedule (e.g., at 9:00 a.m. on a daily basis), cause executable object 220 to request and receive the records of vendor report 250 from vendor system 160. In some examples, as described herein, the elements of processing logic 216 provisioned to virtual machine 202 may also encode additional sequential operations that, when performed by one or more of executed programmatic bots 222 or 224 in response to the receipt of the records of payment report 248 and vendor report 250, cause one or more of executed programmatic bots 222 and 224 to reconcile the auto-loan payments initiated on Aug. 2, 2021, against outstanding balances of the corresponding auto loans issued by the financial institution, and to generate a daily reconciliation report on Aug. 3, 2021, that reflects an outcome of the reconciliation of the auto-loan payments initiated on Aug. 2, 2021.

Figure 2C:
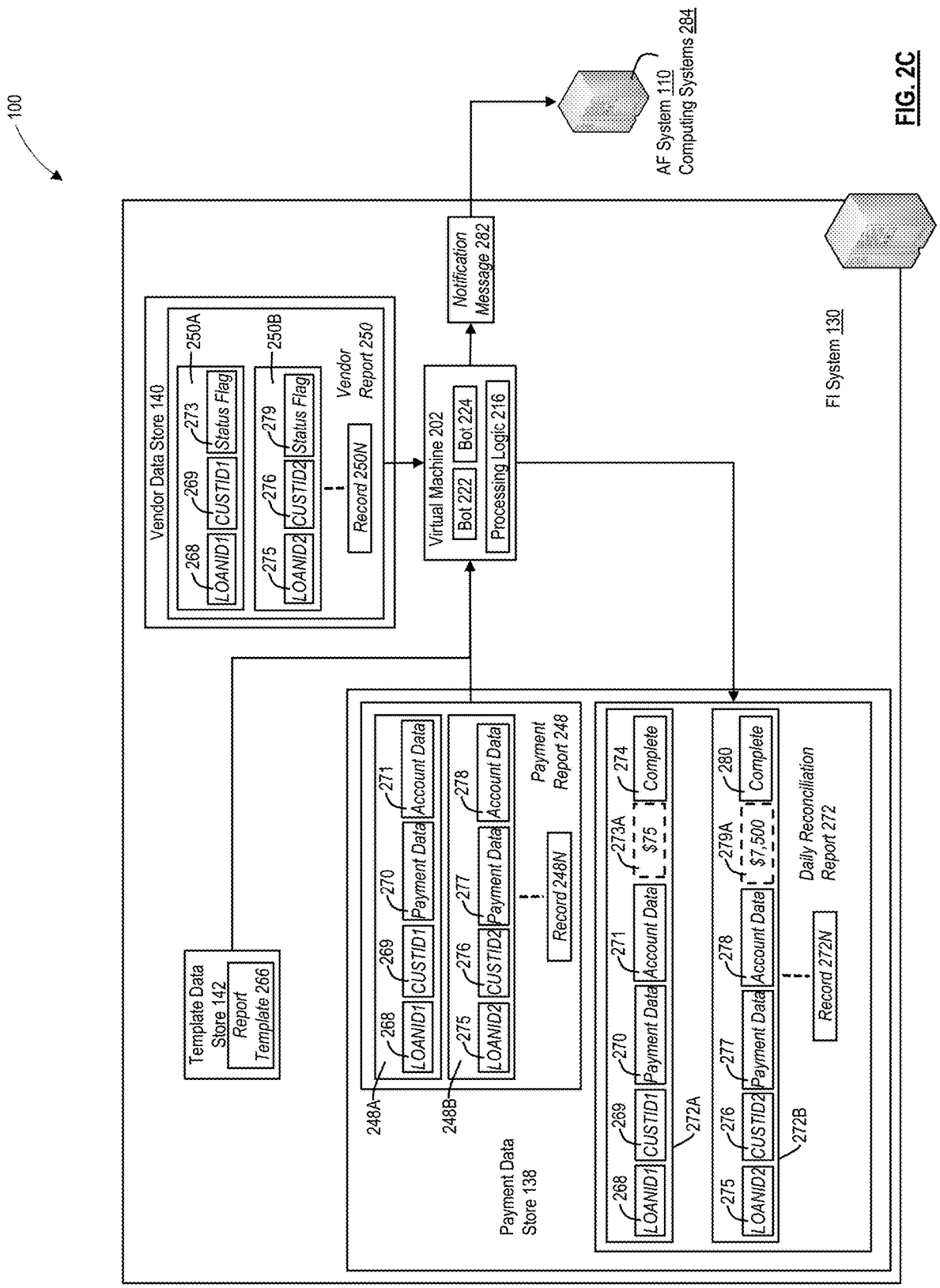

Referring to FIG. 2C, the records of payment report 248 (e.g., as maintained within payment data store 138) may include a plurality of discrete records 248A, 248B, ... 248N, each of which identifies and characterizes corresponding ones of the auto-loan payments initiated by the customers of the financial institution on Aug. 2, 2021. By way of example, each of the records of payment report 248 may include: (i) a unique loan identifier of the corresponding auto-loan payment (e.g., an alphanumeric character string assigned to the corresponding auto-loan payment by the financial institution, etc.); (ii) a unique customer identifier of a customer associated with the auto-loan payment (e.g., a customer name or a unique alphanumeric identifier assigned to the customer by the financial institution, such as an alphanumeric access or login credential); (iii) payment data that identifies and characterizes the auto-loan payment (e.g., a payment amount, or a payment date, etc.); and (iv) and account data that identifies and characterizes a payment instrument selected by the corresponding customer to fund the auto-loan payment (e.g., a payment type, an account number, a bank routing number, etc.). Further, the records of vendor report 250 (e.g., as maintained within vendor data store 140) may include a plurality of discrete records 250A, 250B, ... 250N that each identify a corresponding one of the auto-loan payments initiated on Aug. 2, 2021, and that characterize a current status of the corresponding auto-loan payments (e.g., cleared and settled, returned for NSF, etc.). In some instances, each of records 250A, 250B, ... 250N of vendor report 250 may include a corresponding loan identifier (e.g., the alphanumeric character string assigned to the corresponding auto-loan payment) and an indicator of the current status of the corresponding auto-loan payment.

In some instances, executed RPA management engine 146 may perform additional operations that provision, to instantiated virtual machine 202, records 248A, 248B, ... 248N of payment report 248 and records 250A, 250B, ... 250N of vendor report 250 (e.g., as maintained within respective ones of payment data store 138 and vendor data store 140 of data repository 136). Further, executed RPA management engine 146 may also access template data store 142 of data repository 136, and obtain a report template 266 that characterizes a content and structure of the daily reconciliation report, and may perform operations that provision report template 266 to instantiated virtual machine 202. For example, report template 266 may be formatted in accordance with a document type associated with the daily reconciliation report (e.g., a CSV file, a PDF file, a plain text file, an Excel™ spreadsheet, etc.), and include schema data that identifies one or more data fields of the daily reconciliation report and a structure of the elements of data maintained within each of the data fields.

Based on records 248A, 248B, ... 248N of payment report 248, records 250A, 250B, ... 250N of vendor report 250, and report template 266, one or more of the programmatic bots executed by virtual machine 202, such as executed programmatic bot 222 or executed programmatic bot 224, may perform operations, consistent with the elements of processing logic 216, to reconcile the auto-loan payments initiated on Aug. 2, 2021, against outstanding balances of the corresponding auto loans issued by the financial institution, and to generate a daily reconciliation report on Aug. 3, 2021, that reflects an outcome of the reconciliation of the auto-loan payments initiated on Aug. 2, 2021. By way of example, executed programmatic bot 222 may access records 248A of payment report, which identifies and characterizes a corresponding one of the auto-loan payments initiated on Aug. 2, 2021. As illustrated in FIG. 2C, record 248A may include a loan identifier 268 of the corresponding auto-loan payment (e.g., the alphanumeric character string "LOANID1"), a customer identifier 269 associated with the customer that initiated the corresponding auto-loan payment (e.g., the alphanumeric character string "CUSTID1"), elements of payment data 270 that characterize the corresponding auto-loan payment (e.g., a payment amount, or a payment date, etc.), and elements of account data 271 that identifies and characterizes a payment instrument selected to fund the corresponding auto-loan payment (e.g., a payment type, an account number, a bank routing number, etc.).

In some instances, executed programmatic bot 222 may perform operations, consistent with the elements of processing logic 216, that access report template 266, and that cause FI computing system 130 to store accessed report template within a portion of data repository 136, e.g., as a daily reconciliation report 272 for Aug. 3, 2021. Executed programmatic bot 222 may also perform operations, consistent with the elements of processing logic 216, that incorporate all, or a selected portion, of loan identifier 268, customer identifier 269, the elements of payment data 270, and the elements of account data 271 within a corresponding data record of daily reconciliation report 272, such as data record 272A. By way of example, and in accordance with the elements of processing logic, executed programmatic bot 222 may perform operations that copy all, or the selected portion of, loan identifier 268, customer identifier 269, the elements of payment data 270, and the elements of account data 271 from accessed record 248A, and that paste the copied portions of loan identifier 268, customer identifier 269, payment data 270, and account data 271 within corresponding data fields of record 272A.

Further, executed programmatic bot 222 may perform operations, consistent with the elements of processing logic 216, that access vendor report 250, and that identify one of the records of vendor report 250, such as record 250A, that includes loan identifier 268 and/or customer identifier 269, and that characterizes a current status of the corresponding auto-loan payment identified and characterized by record 248A of payment report 248. By way of example, each of the records of vendor report 250, such as accessed record 250A, may include a corresponding status flag, such as status flag 273 indicating a successful clearance and settlement of the corresponding auto-loan payment, or that the payment network or payment rail returned the corresponding auto-loan payment for insufficient funds (NSF). In some instances, executed programmatic bot 222 may perform operations, consistent with the elements of processing logic 216, that parse accessed data record 250A, obtain status flag 273, and based on status flag 273, determine the current status of the corresponding auto-loan payment, e.g., cleared and settled by the payment network or rail, or returned for NSF.

For example, if executed programmatic bot 222 were to determine, based on status flag 273, that the payment network or rail returned the corresponding auto-loan payment due to insufficient funds, executed programmatic bot 222 may perform operations, consistent with the elements of processing logic 216, that add, into a corresponding field of record 272A of daily reconciliation report 272 (e.g., a "NSF" field) data indicative of the returned status of the corresponding auto-loan payment (e.g., an alphanumeric character string, such as "YES," formatted in accordance with the schema data associated with report template 266). Executed programmatic bot 222 may also perform operations, consistent with the elements of processing logic 216, that determine whether to impose a penalty on the customer that initiated the now-returned auto-loan payment based on, among other things, data characterizing the terms and conditions of the now-returned auto-loan payment or additional data that characterizes the customer or the customer's relationship with the financial institution, such as, but not limited to, the customer's state or province of residence, the customer's tenure at the financial institution, or a history of returned payments involving the customer or the auto loan.

In some instances, if executed programmatic bot 222 were to determine to impose the penalty on the customer, executed programmatic bot 222 may perform operations, consistent with the elements of processing logic 216, that compute the appropriate financial penalty (e.g., in accordance with the terms and conditions, etc.), and that add data identifying the calculated penalty into a corresponding field of record 272A of daily reconciliation report 272 (e.g., a "Penalty" field). The added data may, for example, include a numerical character string identifying a dollar amount of the imposed penalty, and the added data may be formatted in accordance with the schema data associated with report template 266. Alternatively, if executed programmatic bot 222 were to decline to impose the penalty on the customer, executed programmatic bot 222 may perform operations, consistent with the elements of processing logic 216, that add data identifying a zero penalty into the corresponding field of record 272A of daily reconciliation report 272 (e.g., the "Penalty" field). Further, executed programmatic bot 222 may also perform operations, consistent with the elements of processing logic 216, to add further data into an additional field of record 272A of daily reconciliation report 272 (e.g., a "Complete" field) that indicates a completion of the reconciliation process for the corresponding auto-loan payment and marks complete record 272A of daily reconciliation report 272.

In other examples, executed programmatic bot 222 may determine, based on status flag 273, that the payment network or rail cleared and settled successfully the corresponding auto-loan payment due, and based on the determination, executed programmatic bot 222 may perform additional operations, consistent with the elements of processing logic 216, that determine whether the corresponding auto-loan payment represents a predefined exception requiring manual intervention. If executed programmatic bot 222 were to establish that the cleared and settled auto-loan payment corresponds to an exception requiring manual intervention, executed programmatic bot 222 may perform additional operations, consistent with the elements of processing logic 216, that add data characterizing the status of the cleared and settled auto-loan payment as the exception within an additional field of record 272A of daily reconciliation report 272 (e.g., an "Exception" field), and that mark complete record 272A of daily reconciliation report 272, as described herein.

Alternatively, if executed programmatic bot 222 were to establish that the cleared and settled auto-loan payment does not correspond to an exception requiring manual intervention, executed programmatic bot 222 may perform operations, consistent with the elements of processing logic 216, that compute an impact on an outstanding balance of the auto loan associated with the cleared and settled auto-loan payment (e.g., a reduced balance that reflects the cleared and settled auto-loan payment), and that add data (e.g., a numerical string formatted in accordance with the schema associated with report template 266) characterizing the computed impact within an additional field of record 272A of daily reconciliation report 272, e.g., within a corresponding "Balance" field. Executed programmatic bot 222 may also perform any of the exemplary processes described herein to mark complete record 272A of daily reconciliation report 272.

Referring back to FIG. 2C, and based on based on status flag 273 of record 248A, executed programmatic bot 222 may establish that the payment network or rail returned the corresponding auto-loan payment due to insufficient funds, and based on the terms and conditions of the returned auto-loan payment and/or the additional data characterizing the customer or the customer's relationship with the financial institution, executed programmatic bot 222 may determine to impose a $75.00 penalty on the customer. In some instances, executed programmatic bot 222 may perform any of the exemplary processes described herein, consistent with the elements of processing logic 216, to add penalty data 273A identifying the imposed $75.00 penalty to a corresponding field of record 272A (e.g., the "Penalty" field described herein), and to add completion data 274 indicating the completion of the reconciliation process for the returned auto-loan payment, and marking complete record 272A, within a corresponding field of record 272A (e.g., the "Complete" field described herein).

Consistent with the elements of processing logic 216, executed programmatic bot 222 may also perform, repetitively, the exemplary processes described herein to reconcile the auto-loan payments characterized by each additional, or alternate, record of payment report 248, and to generate a corresponding record of daily reconciliation report 272 that reflects an outcome of the reconciliation of each of the auto-loan payments. For example, executed programmatic bot 222 may access an additional record 248B of payment report 248, which identifies and characterizes an additional one of the auto-loan payments initiated on Aug. 2, 2021. As illustrated in FIG. 2C, record 248B may include a loan identifier 275 of the additional auto-loan payment (e.g., the alphanumeric character string "LOANID2"), a customer identifier 276 associated with an additional customer that initiated the additional auto-loan payment (e.g., the alphanumeric character string "CUSTID2"), elements of payment data 277 that characterize the additional auto-loan payment (e.g., a payment amount, or a payment date, etc.), and elements of account data 278 that identifies and characterizes a payment instrument selected to fund the additional auto-loan payment (e.g., a payment type, an account number, a bank routing number, etc.). By way of example, and in accordance with the elements of processing logic 216, executed programmatic bot 222 may perform operations that copy all, or the selected portion of, loan identifier 275, customer identifier 276, the elements of payment data 277, and the elements of account data 278 from accessed record 248B, and that paste the copied portions of loan identifier 275, customer identifier 276, payment data 277, and account data 278 within corresponding data fields of an additional record 272B of daily reconciliation report 272.

Executed programmatic bot 222 may also perform operations, consistent with the elements of processing logic 216, that access vendor report 250, and that identify one of the records of vendor report 250, such as record 250B, that includes loan identifier 275 and/or customer identifier 276, and that characterizes a current status of the additional auto-loan payment identified and characterized by record 248B of payment report 248. By way of example, executed programmatic bot 222 may perform any of the exemplary processes described herein, consistent with the elements of processing logic 216, to access a status flag 279 within record 250B and based on accessed status flag 279, to determine that the payment network or payment rail successfully cleared and settled the additional auto-loan payment initiated by the additional customer on Aug. 2, 2021. Executed programmatic bot 222 may also perform operations, consistent with the elements of processing logic 216, that confirm the additional auto-loan payment fails to represent any exception requiring manual intervention, and that generate impact data 279A the reflects an impact of additional auto-loan payment on an outstanding balance of the corresponding auto loan, e.g., $7,500.00. In some instances, executed programmatic bot 222 may perform operations, consistent with the elements of processing logic 216, that add impact data 279A within a corresponding field of record 272B (e.g., the "Balance" field described herein) and that add completion data 280 indicating the completion of the reconciliation process for the additional auto-loan payment, and marking complete record 272B, within a corresponding data field of record 272B (e.g., the "Complete" field of record 272B).

These exemplary reconciliation processes may be implemented by executed programmatic bot 222 to reconcile the initiated auto-loan payment identified and characterized by each additional, or alternate, one of the records of payment report 248, and to generate a corresponding record of daily reconciliation report 272 that characterizes an outcome of the reconciliation of corresponding ones of the initiated auto-loan payment. By way of example, and upon completion of these exemplary processes, daily reconciliation report 272 may include a plurality of discrete records 272A, 272B, . . . 272N, and executed programmatic bot 222 may perform further operations, consistent with the elements of processing logic 106, that cause FI computing system 130 to store daily reconciliation report 272 within a corresponding portion of data repository 136, e.g., within payment data store 138. Further, executed programmatic bot 222 may also perform operations, consistent with the elements of processing logic 216, that generate a notification message 282 indicative of a successful completion of daily reconciliation report 272 characterizing the auto-loan payments initiated by customers of the financial institution on Aug. 2, 2021.

As illustrated in FIG. 2C, virtual machine 202 may route daily reconciliation report 272 and notification message 282 to executed RPA management engine 146, which may perform operations that cause FI computing system 130 to transmit notification message 282, and in some instances, daily reconciliation report 272, across network 120 to one or more computing systems 284 associated with, or operated by, the financial institution, such as, but not limited to AF system 110. By way of example, executed RPA management engine 146 may perform operations that cause FI computing system 130 to transmit notification message 282 as an email message to one or more email addresses associated with the financial institution (e.g., an email address associated with AF system 110), with daily reconciliation report 272 being included as an attachment to the email message. Further, although not illustrated in FIG. 2C, executed RPA management engine 146 may perform any of the exemplary processes described herein to generate one or more elements of session data, which may confirm the successful generation of daily reconciliation report 272 and the transmission of notification message 282, and store the elements of session data within a portion of data repository 136.

In some instances, programmatic bot 222 executed by virtual machine 202 may perform any of the exemplary processes described herein, in accordance with the elements of processing logic 216, to reconcile, on a daily basis, the auto-loan payments initiated on a prior business day against the outstanding balances of the corresponding auto loans issued by the financial institution, and to generate a daily reconciliation report that reflects an outcome of the reconciliation of each of the auto-loan payments initiated on the prior business day. The disclosed embodiments are, however, not limited to performance of these exemplary processes by a single, executed programmatic bot, and in other instances (not illustrated in FIGS. 2A, 2B, and 2C), multiple programmatic bots executed by virtual machine 202, such as programmatic bots 222 and 224 described herein, may perform one or more of the exemplary processes described herein to reconcile, on a daily basis, the allocated subsets of the auto-loan payments initiated on the prior business day against the outstanding balances of the corresponding auto loans, and to generate a corresponding portion of the daily reconciliation report that reflects an outcome of the reconciliation of the allocated subset of the auto-loan payments initiated on the prior business day.

Figure 3:
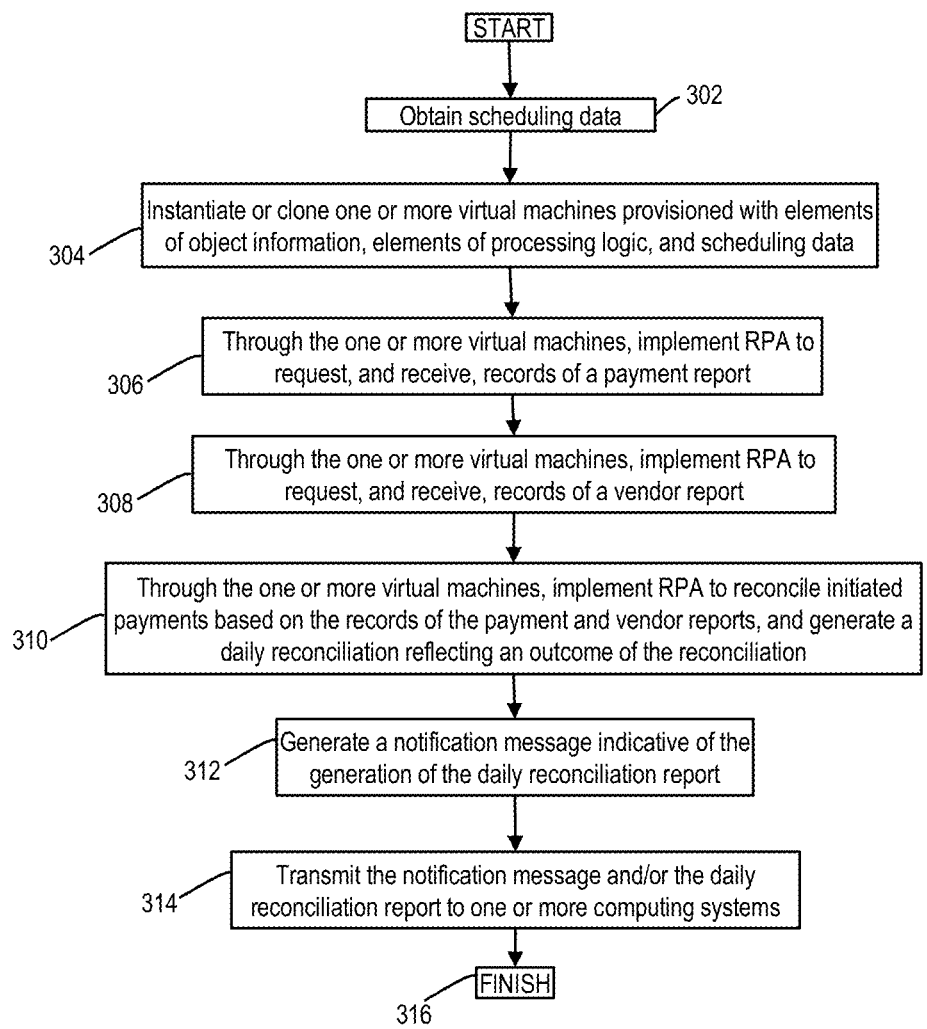
FIG. 3 is a flowchart of an exemplary process for managing reconciliation workflow using robotic process automation, in accordance with some exemplary embodiments.

FIG. 3 is a flowchart of an exemplary process 300 for managing reconciliation workflows using robotic process automation, in accordance with disclosed exemplary embodiments. For example, a network-connected computing system operating within environment 100, such as FI computing system 130, may perform one or more of the steps of exemplary process 300, which include, among other things, detecting an occurrence of a temporal event that triggers a daily reconciliation of payments on existing obligations that were initiated during a prior business day, instantiating one or more virtual machines and provisioning the one of more virtual machines with corresponding elements of object and action data and elements of processing logic. Further, and through an execution of one or more programmatic software robots ("bots") by these virtual machines, the virtual machines instantiated by FI computing system 130 may implement any of the exemplary robotic process automation (RPA) techniques described herein to request and receive records of a payment report that identify and characterize the payments initiated during the prior business day from a graphical user interface (GUI) associated with a first computing system (e.g., AF system 110, as described herein), to request and receive records of a vendor report that characterize a status of the initiated payments from a GUI associated with a second computing system (e.g., vendor system 160, as described herein), to reconcile each of the initiated payments based on the records of the payment and vendor reports, and to generate records of a daily reconciliation report that reflect the reconciliation of the initiated payments.

Referring to FIG. 3, FI computing system 130 may perform any of the exemplary processes described herein to obtain scheduling data that specifies a predetermined temporal schedule for an initiation of the exemplary payment reconciliation processes described herein (e.g., in step 302). For example, the predetermined schedule may be established by the financial institution, and may specify an initiation of the exemplary payment reconciliation processes at a predetermined time on a daily basis, such as at 9:00 a.m. In some examples, FI computing system 130 may store the scheduling data within one or more tangible, non-transitory memories, such as, but not limited to, within a corresponding portion of data repository 136.

FI computing system 130 may also perform any of the exemplary processes described herein to instantiate one or more virtual machines provisioned with elements of object information, elements of processing logic, and the scheduling data, and additionally, or alternatively, to clone one or more previously instantiated and provisioned virtual machines (e.g., in step 304). As described herein, each of the provisioned elements of the object information may include an application model and action data, and when processed by the instantiated or cloned virtual machines, the provisioned elements of object information may enable each of the instantiated or cloned virtual machines to generate one or more executable objects based on corresponding ones of the application models and action data, and to establish one or more programmatic software robots (e.g., "bot"), each of which includes a corresponding one of the generated executable objects.

By way of example, each of the application models may expose a corresponding one of the executable objects, and as such, one or more of the programmatic bots that include the corresponding executable object, to an application program executed by a computing system within environment 100 (e.g., a respective one of payment application 226 executed by AF system 110, which maintains the records of payment report 248, and vendor application 236 executed by vendor system 160, which maintains the records of vendor report 250) and further, may identify and characterize interface elements displayed within one or more display screens of a GUI or digital portal generated and presented by a front-end component of that executed application (e.g., a respective one of GUI 230 presented by front-end 228 of executed payment application 226, and GUI 240 presented by front-end 238 of executed vendor application 236). Additionally, and as described herein, the action data associated with each of the application models may include those discrete or sequential actions that the corresponding executable object, and the one or more programmatic bots that include the corresponding executable object, may perform during interaction with the GUIs or the digital portals in accordance with the application model and the elements of processing logic.

Further, and as described herein, the elements of processing logic may encode sequential operations performed by corresponding ones of the executed programmatic bots in accordance with the predetermined schedule specified within the scheduling data. In some instances, one or more of the executed programmatic bots may be configured by the elements of the processing logic to interact with a corresponding one of the application programs executed by AF system 110 and vendor system 160, and to perform actions or operations specified by the elements of processing logic and consistent with the scheduling data, such as, but not limited to, logging into the corresponding GUI or digital portal associated with the application programs executed by AF system 110 and vendor system 160 (e.g., GUI 230 presented by front-end 228 of executed payment application 226 and GUI 240 presented by front-end 238 of executed vendor application 236), requesting and receiving records of a payment report and vendor report maintained by respective ones of AF system 110 and vendor system 160, and logging out of the corresponding GUI or digital portal. Further, the elements of the processing logic may also configure one or more of the executed programmatic bots to perform any of the exemplary processes described herein that, in accordance with the predetermined schedule, reconcile the payments initiated during the prior temporal interval based on corresponding ones of the received records of the payment and vendor reports, and generate corresponding records of a reconciliation report that reflect, and characterizes, the reconciliation of the initiated payments.

In accordance with the predetermined schedule, and upon execution by FI computing system 130, a programmatic bot established by one or more of the instantiated or cloned virtual machines may implement any of the exemplary RPA-based techniques described herein (e.g., in accordance with the provisioned elements of processing logic) to request, and receive, records of the payment report from AF system 110 (e.g., in step 306). As described herein, the predetermined schedule may specify that the programmatic bot request and receive the records of the payment report at a predetermined time on a daily basis, such as at 9:00 a.m., and the records of the payment report (e.g., the records of payment report 248, described herein) may identify and characterize one or more auto-loan payments initiated by customers of the financial institution during a prior business day. By way of example, and as described herein, the elements of processing logic provisioned to each of the virtual machines may encode sequential operations that, when performed by the executed programmatic bot, cause a respective one of the executable objects to access GUI 230 generated and presented by front-end 228 of payment application 226 executed by AF system 110, and to request and receive, via accessed GUI 230, one or more records of payment report 248 maintained within payment data store 234 of AF system 110.

Further, in accordance with the predetermined schedule, upon execution by FI computing system 130, an additional, or alternate, programmatic bot established by one or more of the instantiated or cloned virtual machines may implement any of the exemplary RPA-based techniques described herein (e.g., in accordance with the provisioned elements of processing logic) to request, and receive, records of the vendor report from vendor system 160 (e.g., in step 308). As described herein, the predetermined schedule may specify that the programmatic bot request and receive the records of the vendor report at a predetermined time on a daily basis, such as at 9:00 a.m., and the records of the vendor report (e.g., the records of vendor report 250, described herein) may identify the one or more auto-loan payments initiated during the prior business day, and characterize a current status of the initiated auto-loan payments, e.g., cleared and settled or returned for insufficient funds (NSF). By way of example, and as described herein, the elements of processing logic provisioned to each of the virtual machines may encode sequential operations that, when performed by additional, or alternate, executed programmatic bot, cause a respective one of the executable objects to access GUI 240 generated and presented by front-end 238 of vendor application 236 executed by vendor system 160, and to request and receive, via accessed GUI 240, one or more records of vendor report 250 maintained within vendor data store 244 of vendor system 160.

In some examples, and upon execution by FI computing system 130, one or more of the programmatic bots established by one or more of the instantiated or cloned virtual machines may implement any of the exemplary RPA-based techniques described herein (e.g., in accordance with the provisioned elements of processing logic) to reconcile the auto-loan payments initiated during a prior business day against outstanding balances of the corresponding auto loans based on the obtained elements of the payment and vendor reports, and to generate records of a daily reconciliation report that reflects an outcome of the reconciliation of the auto-loan payments initiated on the prior business day (e.g., in step 310 of FIG. 3). As described herein, the daily reconciliation report (e.g., daily reconciliation report 272 of FIG. 2C) may include a plurality of discrete records (e.g., records 272A, 272B, . . . , 272N), and each of the records of daily reconciliation report 272 may include a portion of a corresponding one of the records of payment report 248 that identify and characterize a corresponding one of the initiated auto-loan payments (e.g., a corresponding one of records 248A, 248B, . . . 248N), and may include additional data reflecting an outcome of a reconciliation of the corresponding auto-loan payment against the outstanding loan balance. Further, the one or more of the executed programmatic bots may also perform any of the exemplary processes described herein, in accordance with the provisioned elements of processing logic, to generate a notification message (e.g., an email message, etc.) that indicates, and confirms, a successful completion of the daily reconciliation report characterizing the auto-loan payments initiated by customers of the financial institution on the prior business day (e.g., in step 312 of FIG. 3).

FI computing system 130 may also perform any of the exemplary processes described herein to transmit the generated notification message, and in some instances, the daily reconciliation report, across network 120 to one or more computing systems associated with, or operated by, the financial institution, such as, but not limited to AF system 110 (e.g., in step 314 of FIG. 3). By way of example, FI computing system 130 may transmit the notification message as an email message to one or more email addresses associated with the financial institution (e.g., an email address associated with AF system 110), with the daily reconciliation report being included as an attachment to the email message. Exemplary process 300 is then complete in step 316.

Figure 4:
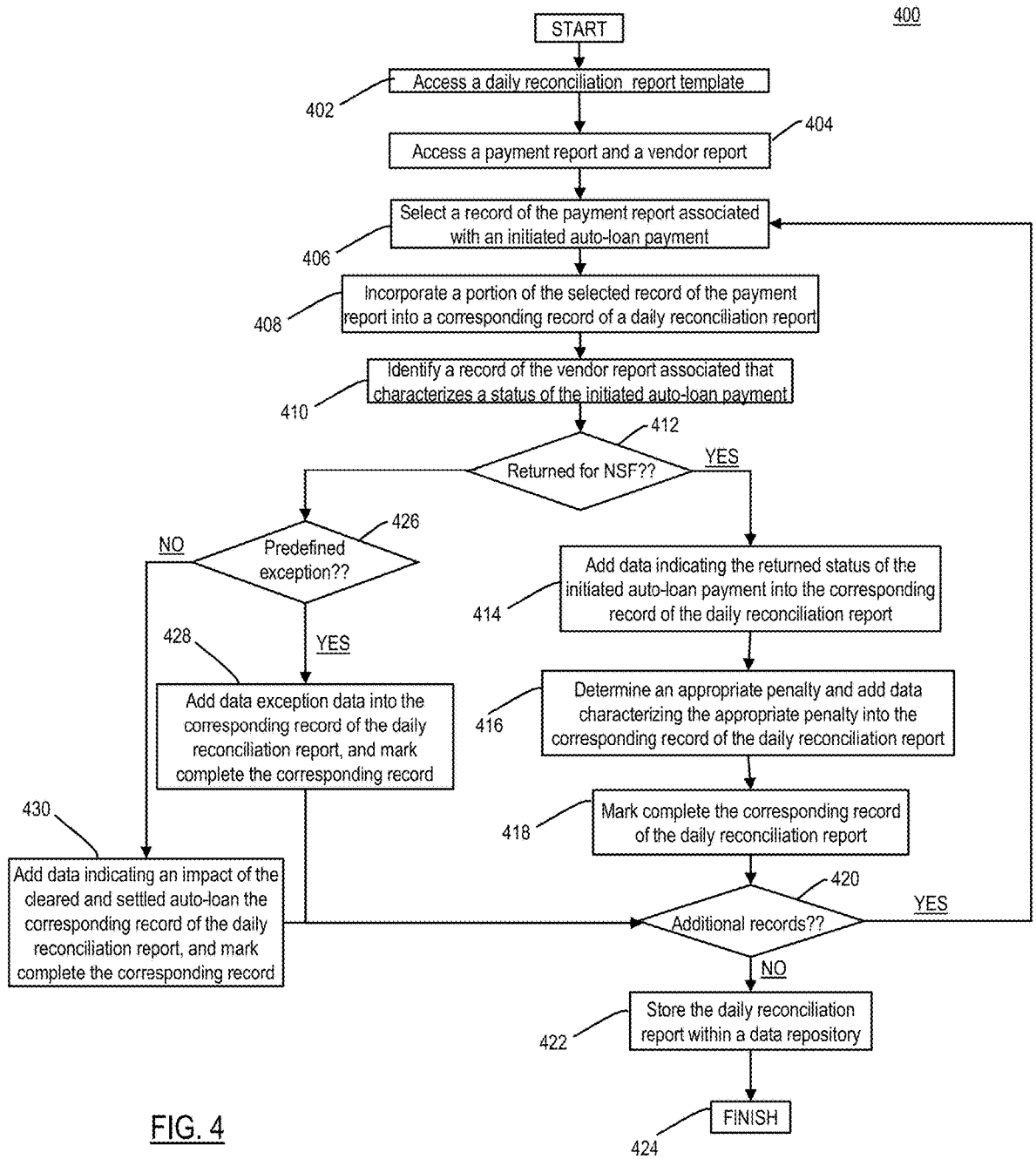
FIG. 4 is a flowchart of an exemplary reconciliation process, in accordance with some exemplary embodiments.

FIG. 4 is a flowchart of an exemplary process 400 for reconciling initiated payments against balances associated with corresponding obligations using robotic process automation (RPA), in accordance with disclosed exemplary embodiments. For example, a programmatic software robot (e.g., a "bot") executed by a virtual machine instantiated or cloned by FI computing system 130 may perform one or more of the exemplary steps of process 400 in accordance with elements of processing logic provisioned to the instantiated or cloned virtual machine, and based on records of a payment report and a vendor report, and received, via a virtualized implementation of any of the exemplary RPA techniques described herein.

Referring to FIG. 4, the executed programmatic bot may, in accordance with the elements of processing logic, access a daily reconciliation report template maintained within the one or more tangible, non-transitory memories, such as within template data store 142 of data repository 136 (e.g., in step 402 of FIG. 4). In some instances, FI computing system 130 may perform any of the exemplary processes described herein to provision the daily reconciliation report template to the instantiated or cloned virtual machine, and as described herein, the daily reconciliation report template may be formatted in accordance with a document type associated with the daily reconciliation report (e.g., a CSV file, a PDF file, a plain text file, an Excel™ spreadsheet, etc.), and include schema data that identifies one or more data fields of the daily reconciliation report and a structure of the elements of data maintained within each of the data fields. Further, in step 402, the executed programmatic bot may perform operations, consistent with the elements of processing logic, that store accessed daily reconciliation report template within a portion of an accessible data repository, e.g., as a daily reconciliation report for a current business day.

In some instances, the executed programmatic bot may perform operations, consistent with the elements of processing logic, that access a payment report that identifies and characterizes payments associated with corresponding obligations initiated by customers of the financial institution during a prior temporal interval, and a vendor report that characterizes a status of each of the initiated payments (e.g., in step 404 of FIG. 4). As described herein, the obligations may correspond to auto loans issued to the customers by the financial institution, payment report may include a plurality of discrete records (e.g., records 248, 2486, . . . 248N of payment report 248), each which of identify and characterize an auto-loan payment initiated during a prior business day, and the vendor report may include a plurality of discrete records (e.g., records 250A, 250B, . . . 250N of vendor report 250), each of which identify one of the initiated auto-loan payments and characterize a current status of that initiated auto-loan payment, such as cleared and settled or returned for insufficient funds (NSF).

The executed programmatic bot may perform operations, consistent with the elements of processing logic, that select a corresponding one of the auto-loan payments initiated during the prior business day for reconciliation, and that access a record of the payment report (e.g., record 248A of payment report 248) that identifies and characterizes the corresponding one of the initiated auto-loan payments (e.g., in step 406 of FIG. 4). By way of example, and as described herein, the selected record may include, for the corresponding auto-loan payment, a unique loan identifier (e.g., an alphanumeric character string assigned to the corresponding auto-loan payment by the financial institution, etc.), a unique customer identifier (e.g., a customer name or a unique alphanumeric identifier assigned to the customer by the financial institution, such as an alphanumeric access or login credential), payment data (e.g., a payment amount, or a payment date, etc.), and account data that identifies and characterizes a payment instrument (e.g., a payment type, an account number, a bank routing number, etc.).

The executed programmatic bot may also perform operations, consistent with the elements of processing logic, that incorporate all, or a selected portion, of the loan identifier, the customer identifier, the payment data, and the account data maintained within the selected record into a corresponding record of the daily reconciliation report, such as within data record 272A of daily reconciliation report 272 (e.g., in step 408 of FIG. 4). By way of example, and in accordance with the elements of processing logic, the executed programmatic bot may perform operations that copy all, or the selected portion of, the loan identifier, the customer identifier, the payment data, and the account data from accessed record of the payment report, and that paste the copied portions of the loan identifier, the customer identifier, the payment data, and the account data within corresponding data fields of the record of the daily reconciliation report.

In some instances, the executed programmatic bot may perform operations, consistent with the elements of processing logic, that parse the records of the vendor report and identify a corresponding one of the records (e.g., record 250A of vendor report 250) that includes the loan identifier or customer identifier associated with the selected auto-loan payment and as such, that characterizes a current status of the selected auto-loan payment (e.g., in step 410 of FIG. 4). As described herein, the corresponding record of the vendor report may include the loan identifier and/or the customer identifier associated with the selected auto-loan payment, along with status data (e.g., a status flag) that characterizes a current status of the selected auto-loan payment identified and characterized by record 248A of payment report 248. Further, by way of example, the status flag indicating a successful clearance and settlement of the selected auto-loan payment, or that the payment network or payment rail returned the selected auto-loan payment for insufficient funds (NSF).

Based on status flag, the executed programmatic bot may perform any of the exemplary processes described herein, consistent with the elements of processing logic, to determine whether the payment network or rail returned the selected auto-loan payment due to insufficient funds (e.g., in step 412 of FIG. 4). If, for example, the executed programmatic bot were to determine, based on the status flag, that the payment network or rail returned the selected auto-loan payment due to insufficient funds (e.g., step 412; YES), executed programmatic bot 222 may perform any of the exemplary processes described herein, consistent with the elements of processing logic, that add, into a corresponding field of the record of the daily reconciliation report, data indicative of the returned status of the corresponding auto-loan payment (e.g., in step 414 of FIG. 4). By way of example, the data indicative of the returned status may include an alphanumeric character (e.g., "YES"), which may be added by the executed programmatic bot into a "NSF" field of the record of the daily reconciliation report, and which may be formatted in accordance with the schema data associated with the report template 266. The executed programmatic bot may also perform operations, consistent with the elements of processing logic, that determine a financial penalty appropriate for imposition on the customer that initiated the now-returned auto-loan payment based on, among other things, data characterizing the terms and conditions of the now-returned auto-loan payment or additional data that characterizes the customer or the customer's relationship with the financial institution, such as, but not limited to, the customer's state or province of residence, the customer's tenure at the financial institution, or a history of returned payments involving the customer or the auto loan (e.g., in step 416 of FIG. 4).

In some instances, in step 416, the executed programmatic bot may perform operations, consistent with the elements of processing logic, that compute the appropriate financial penalty (e.g., in accordance with the terms and conditions, etc.), and that add data identifying the calculated penalty (e.g., a zero or non-zero value) into a corresponding field of the record of daily reconciliation report (e.g., a "Penalty" field). The added data may, for example, include a numerical character string identifying a dollar amount of the imposed penalty, and the added data may be formatted in accordance with the schema data associated with report template 266. Further, the executed programmatic bot may also perform operations, consistent with the elements of processing logic 216, to add further data into an additional field of the record of daily reconciliation report (e.g., a "Complete" field) that indicates a completion of the reconciliation process for the selected auto-loan payment and marks complete the record of the daily reconciliation report (e.g., in step 418 of FIG. 4).

The executed programmatic bot may perform further operations, consistent with the elements of processing logic, that parse the records of the payment report and determine whether additional auto-loan payments, initiated on the prior business day, await reconciliation processing (e.g., in step 420 of FIG. 4). If the executed programmatic bot were to determine that additional one of the initiated auto-loan payments await reconciliation processing (e.g., step 420; YES), exemplary process 400 may pass back to step 406, and the executed programmatic bot may perform further operations, consistent with the elements of processing logic, that select an additional one of the auto-loan payments initiated during the prior business day for reconciliation. Alternatively, if the executed programmatic bot were to determine that none of the initiated auto-loan payments await reconciliation processing (e.g., step 420; NO), the executed programmatic bot may perform operations, consistent with the elements of processing logic, that store the daily reconciliation report within a data repository accessible to FI computing system 130, such as payment data store 138 of data repository 136 (e.g., in step 422 of FIG. 4), and exemplary process 400 is complete in step 424.

Referring back to step 412, if the executed programmatic bot were to determine, based on the status flag, that the payment network or rail successfully cleared and settled the selected auto-loan payment due (e.g., step 412; NO), the executed programmatic bot may perform any of the exemplary processes described herein, consistent with the elements of processing logic, to determine whether the selected auto-loan payment represents a predefined exception requiring manual intervention (e.g., in step 426 of FIG. 4). If executed programmatic bot 222 were to establish that the cleared and settled auto-loan payment corresponds to an exception requiring manual intervention (e.g., step 426; YES), the executed programmatic bot may perform any of the exemplary processes described herein, consistent with the elements of processing logic, that add data characterizing the status of the cleared and settled auto-loan payment as the exception within an additional field of record of the daily reconciliation report (e.g., an "Exception" field), and that mark complete record of the daily reconciliation report (e.g., in step 428 of FIG. 4). Exemplary process 400 may pass back to step 420, and the executed programmatic bot may perform any of the exemplary processes described herein, consistent with the elements of processing logic, that parse the records of the payment report and determine whether additional auto-loan payments, initiated on the prior business day, await reconciliation processing.

Alternatively, if the executed programmatic bot were to establish that the cleared and settled auto-loan payment does not correspond to an exception requiring manual intervention (e.g., step 426; NO), the executed programmatic bot may perform any of the exemplary processes described herein, consistent with the elements of processing logic, that compute an impact on an outstanding balance of the auto loan associated with the cleared and settled auto-loan payment, and that add data (e.g., a numerical string formatted in accordance with the schema associated with the report template) characterizing the computed impact within an additional field of the record of the daily reconciliation report (e.g., in step 430 of FIG. 4). In some instances, exemplary process 400 may pass back to step 420, and the executed programmatic bot may perform any of the exemplary processes described herein, consistent with the elements of processing logic, that parse the records of the payment report and determine whether additional auto-loan payments, initiated on the prior business day, await reconciliation processing.

C. Exemplary Processes for Managing Reporting Workflow Using Robotic Process Automation As described herein, the financial institution associated with AF system 110 and FI computing system 130 may receive, on a daily basis, many thousands of payments initiated by customers in satisfaction of corresponding obligations, such as, but not limited to auto-loan payments initiated by customers of the financial institution. Each of these initiated, and subsequent cleared and settled, auto-loan payments may be associated with a corresponding auto loan issued by the financial institution, and may be initiated by the customers during a corresponding temporal redemption period, e.g., in accordance with a payment schedule associated with the corresponding auto loan. Further, these initiated auto-loan payments, once successfully cleared and settled by one or more payment networks or payment rails, may represent a source of proceeds for the financial institution (and further, for the automotive financial unit associated with AF system 110), and AF system 110 may track the proceeds derived from the auto-loan payments associated with each of these auto loans, on a daily basis, within corresponding elements of proceeds data, which AF system 110 may maintain within a portion of payment data store 234.

In some instances, the auto loan issued by the financial institution, and managed and serviced by the automotive financial institution, may establish a portfolio of assets capable of monetization by the financial institution. For example, and during a corresponding redemption period, the financial institution may elect to sell, or assign, a right to manage, service, and receive payments associated with one or more auto loans to an unrelated, third-party loan servicer in exchange for a mutually agreed-upon sum. The funds derived from the sale or assignment of the auto-loans may represent additional proceeds associated with these auto loans, and AF system 110 may track these additional proceeds within corresponding elements of proceeds data maintained within payment data store 234 on a daily basis. Further, upon expiration of the redemption period for a corresponding one of the auto loans, and upon initiation, and successful clearance and settlement of each of the scheduled auto-loan payments during the redemption period, the corresponding auto loan may be fully redeemed by the financial institution, and the interest of the financial institution in the automobile purchased using the now-redeemed auto loan may be released by the financial institution. The redeemed auto loan may, for example, represent a loss in proceeds to the automotive financing unit (and the financial institution), and AF system 110 may track those auto loans fully redeemed by the financial institution on a daily basis within corresponding elements of proceeds data maintained in payment data store 234.

Further, and in addition to generating the daily reconciliation report that characterizes the reconciliation of the auto-loan payments initiated by customers of the financial institution during a prior business day against outstanding balances of corresponding auto loans issued by the financial institution, one or more computing systems associated with the financial institution, such as FI computing system 130, may also perform any of the exemplary processes described herein to generate, on a daily basis, a sales, proceeds, and redemptions (SPR) report that identifies and characterizes each of the auto loans under redemption at the financial institution during a prior business day, each of the auto loans sold or assigned by the financial institution to unrelated, third-party loan servicers during the prior business day, and further, each of the auto loans fully redeemed by the financial institution during a prior temporal interval that includes, and extends beyond, the prior business day. By way of example, FI computing system 130 may perform any of the exemplary processes described herein to instantiate one or more virtual machines, and through a virtualized implementation of robotic process automation (RPA) techniques by these virtual machines, compile, update, and/or distribute the updated SPR report based on, among other things, the elements of proceeds data generated and maintained by AF system 110 during the prior business day, and an existing copy of the SPR report generated during the prior business day and maintained at AF system 110.

For example, as described herein, FI computing system 130 may perform operations that instantiate or clone the one or more virtual machines, which may be provisioned with corresponding elements of object and action data and elements of processing logic that, collectively, enable these instantiated virtual machines to execute corresponding programmatic software robots (e.g., bots). These executed programmatic bots may, for example, implement one or more exemplary RPA techniques that, as described herein, access GUIs or digital portals maintained by corresponding, and discrete, application programs executed by AF system 110 (and associated with corresponding and discrete, data repositories at AF system 110), and request and receive elements of proceeds data and the existing copy of the SPR report from AF system 110 via virtualized, and robotic interaction, with corresponding ones of the GUIs. Further, through an implementation of these RPA techniques, the bots executed by one or more of the instantiated virtual machines may also perform operation that, in accordance with the elements of processing logic, compile or update portions of the existing copy of the SPR report to reflects the auto loans sold, under redemption, or fully redeemed during the prior business day based on the received elements of proceeds data, and distribute the notification indicative of the completion of the updated SPR report, and in some instances, the updated SPR report, to one or more computing system associated with the financial institution, such as AF system 110.

In some instances, the virtualized implementation of these exemplary RPA techniques by FI computing system 130 may reduce the number of discrete interactions between computing systems of the financial institution and the GUIs or digital portals of AF system 110, and as such, the number of discrete computational operations by these computing systems, required to access and obtain the proceeds data and existing SPR report, and to compile and distribute the updated SPR report, on a daily basis. Additionally, and as described herein, the virtualized implementation of these exemplary RPA techniques by FI computing system 130 may also reduce unauthorized access to, and distribution of, confidential customer information within the financial institution (e.g., due to a reduction in an exposure of this information among representatives of the financial institution), and further, may reduce a likelihood of attacks by malicious third parties on AF system 110 and vendor system 160, and increase a security and confidentiality of the underlying elements of customer information at AF system 110 and vendor system 160 (e.g., due to a reduction in an exposure of corresponding application programming interfaces across network 120).

Figure 5A:
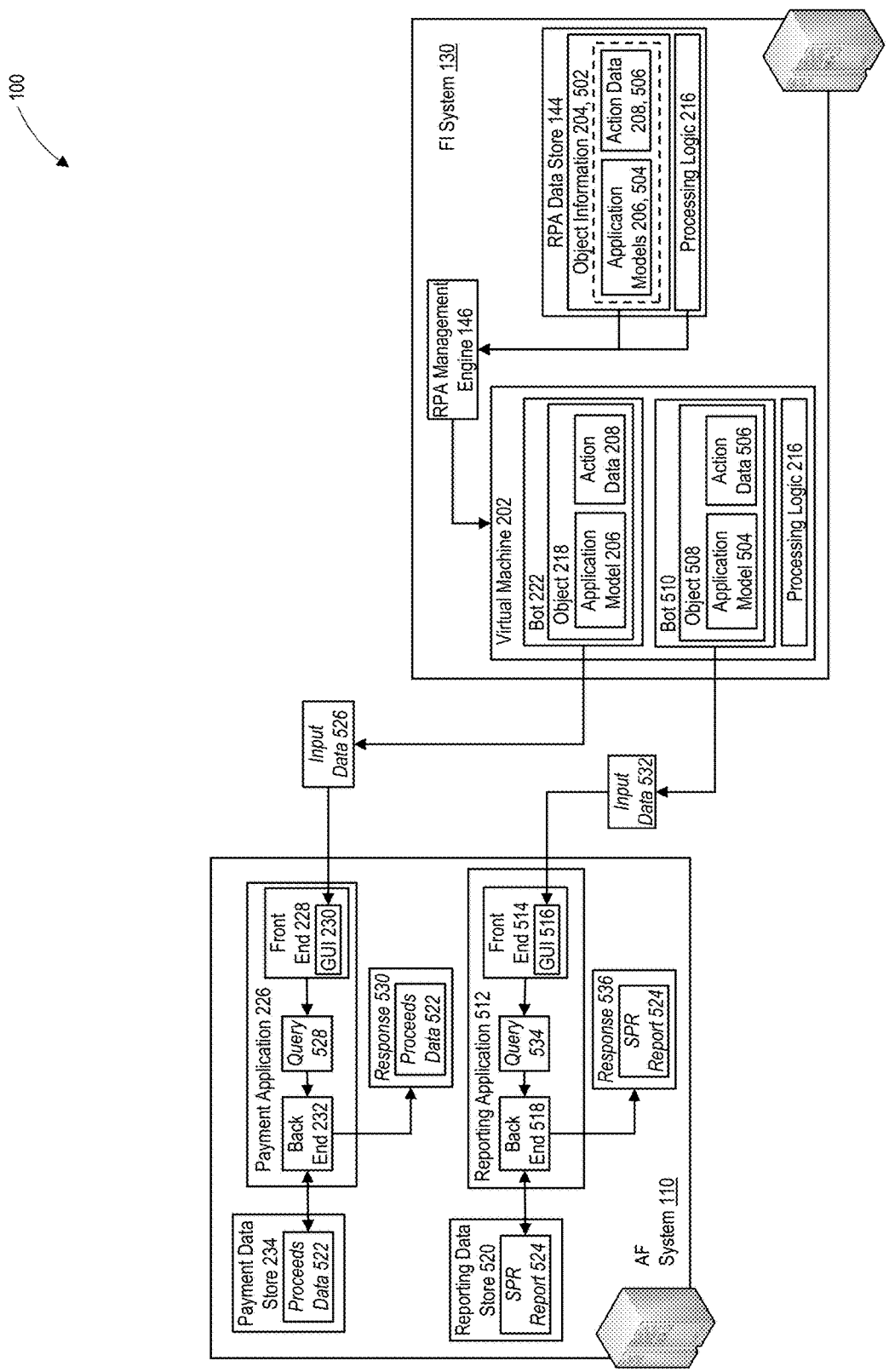
FIGS. 5A, 5B, and 5C are block diagrams illustrating portions of an exemplary computing environment, in accordance with some exemplary embodiments.

Referring to FIG. 5A, executed RPA management engine 146 may perform any of the exemplary processes described herein to instantiate (or clone) one or more virtual machines at FI computing system 130, and that manage an execution of each of the instantiated virtual machines, such as, but not limited to, virtual machine 202. Further, and as described herein, each of the instantiated virtual machines may execute one or more programmatic bots, and the executed programmatic bots may be configured by the elements of processing logic to perform operations that, on a daily basis, obtain elements of the proceeds data and the existing SPR report from respective data repositories of AF system 110, compile and distribute the updated SPR report based on the obtained elements of the proceeds data and the existing SPR report, and generate a notification of completion of the updated SPR report to one or more computing systems of the financial institution, e.g., using any of the exemplary RPA techniques described herein.

For example, as illustrated in FIG. 5A, executed RPA management engine 146 may perform operations that access RPA data store 144 maintained within the one or more tangible, non-transitory memories of FI computing system 130, and that provision, to instantiated virtual machine 202, object information 204 (which includes application model 206 and action data 208) and object information 502 (which includes application model 504 and action data 506), along with the one or more elements of processing logic 216 described herein. As described herein, virtual machine 202 may process object information 204 and perform operations that generate executable object 218 based on application model 206 and action data 208, and that establish programmatic bot 222 that includes executable object 218. Further, virtual machine 202 may process object information 502 and perform operations that generate executable object 508 based on application model 504 and action data 506, and that establish programmatic bot 510 that includes executable object 508.

As described herein, application model 206 may expose executable object 218 to executed payment application 226 of AF system 110, which includes application front-end 228 and application back-end 232. Further, and as described herein, application front-end 228 may be exposed to FI computing system 130 via GUI 230, and application back-end 232 may access corresponding elements of confidential data (e.g., as maintained within payment data store 234) based on commands generated by application front-end 228 in response to interaction with GUI 230. Further, application back-end 232 may perform any of the exemplary processes described herein to selectively provision, or deny, requests to access the elements of confidential data (e.g., the elements of proceeds data 522 described herein) received by application front-end 228, e.g., based on input to the interface elements of GUI 230.

Further, application model 504 may expose executable object 508 to an additional application program executed by AF system 110, such as reporting application 512, and an application front-end 514 of executed reporting application 512 may be exposed to FI computing system 130 via a corresponding GUI, such as a GUI 516. In some instances, an application back-end 518 of executed reporting application 512 may access corresponding elements of confidential data (e.g., as maintained within reporting data store 520) based on commands generated by application front-end 514 in response to interaction with GUI 516, and application back-end 518 may perform any of the exemplary processes described herein to selectively provision, or deny, requests to access the elements of confidential data (e.g., the existing SPR reports described herein) received by application front-end 514, e.g., based on input to the interface elements of GUI 516. The disclosed embodiments are, however, not limited to the generation of bots 222 and 510 that include respective ones of executable objects 218 and 508. In additional examples, virtual machine 202 may perform any of the exemplary processes described herein to establish a single bot that includes both executable objects 218 and 508, or to generate any number of additional or alternate programmatic software robots that include, respectively, a selected one of executable objects 218 and 508, or alternatively, each of executable objects 218 and 508.

In some instances, as described herein, executed RPA management engine 146 may provision additional scheduling data that identifies a predetermined schedule for initiating a performance of the exemplary, RPA-based reconciliation processes described herein by executed programmatic bots 222 and 510 in accordance with a predetermined schedule established by the financial institution, e.g., at a predetermined time on a daily basis, such as 4:30 p.m. The elements of processing logic 216 may encode additional sequential operations that, when performed by executed programmatic bot 222 in accordance with the predetermined schedule (e.g., at 4:30 p.m. on a daily basis), cause executable object 218 to access GUI 230 of executed payment application 226, and to request and receive, via accessed GUI 230, one or more elements of proceeds data 522 maintained by AF system 110 within payment data store 234. Further, the elements of processing logic 216 may encode further sequential operations that, when performed by executed programmatic bot 510 in accordance with the predetermined schedule (e.g., at 4:30 p.m. on a daily basis), cause executable object 508 to access GUI 516 of executed reporting application 512, and to request and receive, via accessed GUI 516, one or more records of an existing SPR report 524 maintained by AF system 110 within reporting data store 520.

As described herein, the elements of proceeds data 522 may identify and characterize each of those auto-loan under redemption, sold by the financial institution (and in some instances fully redeemed by the financial institution) during a current business day, along with data characterizing the proceeds derived from the sale or redemption of these auto loans during a current business day. Further, the records of existing SPR report 524 may identify and characterize each of the auto loans under redemption at the financial institution during a prior business day, each of the auto loans sold or assigned by the financial institution to unrelated, third-party loan servicers during the prior business day, and further, each of the auto loans fully redeemed by the financial institution during the prior business day.

By way of example, and in accordance with the predetermined schedule on a particular business day (e.g., at 4:30 p.m. on Aug. 3, 2021), each of executed programmatic bots 222 and 510 may perform operations, consistent with the elements of processing logic 216, that establish communications with AF system 110 across network 120. Further, executed programmatic bot 222 may also perform operations, consistent with the elements of processing logic 216, that cause executable object 224 to access GUI 230 of executed payment application 226, and executed programmatic bot 510 may perform similar operations, consistent with the elements of processing logic 216, that cause executable object 508 to access GUI 516 of executed reporting application 512. In some instances, not illustrated in FIG. 5A, executed programmatic bots 222 and 510 may perform any of the exemplary processes described herein to provision, to corresponding ones of GUIs 230 and 516, one or more elements of credential data associated with FI computing system 130.

Based upon a successful authentication of the elements of credential data by payment application 226, executed programmatic bot 222 may perform any of the exemplary processes described herein to provide, as input to GUI 230, information that requests elements of proceeds data 522, which identify and characterize each of the auto-loans under redemption and sold by the financial institution (and in some instances fully redeemed by the financial institution) during the current business day (e.g., prior to 4:30 p.m. on August $3^{rd}$) along with data characterizing the proceeds derived from the sale or redemption of these auto loans. For example, as illustrated in FIG. 5A, executed programmatic bot 222 may generate input data 526 that includes an identifier of the requested proceeds data, temporal data specifying the current business day (e.g., Aug. 3, 2021), and in some instances, an identifier of the financial institution (e.g., a cryptogram, hash value, or digital token, etc.), and FI computing system 130 may transmit input data 526 across network 120 to AF system 110, e.g., as additional input to GUI 230. In some instances, a format or structure of each of the identifiers and the temporal data may be consistent with application model 206, which identifies and characterizes the interface elements displayed within one or more display screens of GUI 230, and/or action data 208, which specifies one or more actions capable of performance by executable object 218 during interaction with GUI 230.

AF system 110 may receive input data 526, and application front-end 228 of executed payment application 226 may process input data 526 provisioned to GUI 230, and may generate a corresponding query 528 for the requested proceeds data compiled on Aug. 3, 2021, and maintained at AF system 110. Query 528 may, for example, include the identifier of the proceeds data and the temporal data specifying the requested August $3^{rd}$ date, and application front-end 228 may provide query 528 as an input to application back-end 232 of executed payment application 226. Application back-end 232 may perform operations that access payment data store 234, and based on query 528, application back-end 232 may obtain elements of proceeds data 522 from payment data store 234. In some instances, application back-end 232 may perform operations that encrypt the elements of proceeds data 522 using, for example, a public cryptographic key associated with, or generated by, FI computing system 130. Application back-end 232 may also perform operations that generate a response to query 528, e.g., response 530, and package the encrypted elements of proceeds data 522 into a corresponding portion of response 530. Application back-end 232 may perform additional operations that cause AF system 110 to transmit response 530 across network 120 to FI computing system 130.

Further, and based upon a successful authentication of the elements of credential data by reporting application 512, executed programmatic bot 510 may perform any of the exemplary processes described herein to provide, as input to GUI 516, information that requests the existing SPR report compiled, updated, and/or distributed on Aug. 2, 2021 (e.g., the prior business day). For example, executed programmatic bot 510 may generate input data 532 that includes an identifier of existing SPR report, temporal data specifying the prior business day (e.g., Aug. 2, 2021), and in some instances, and identifier of the financial institution (e.g., a cryptogram, hash value, or digital token, etc.), and FI computing system 130 may transmit input data 532 across network 120 to AF system 110, e.g., as additional input to GUI 516. In some instances, a format or structure of each of the identifiers and the temporal data may be consistent with application model 504, which identifies and characterizes the interface elements displayed within one or more display screens of GUI 516, and/or action data 506, which specifies one or more actions capable of performance by executable object 508 during interaction with GUI 516.

AF system 110 may receive input data 532, and application front-end 514 of executed reporting application 512 may process input data 532 provisioned to GUI 516, and may generate a corresponding query 534 for the requested SPR report. Query 534 may, for example, include the identifier of the requested SPR report and the temporal data specifying the requested August $2^{nd}$ date, and application front-end 514 may provide query 534 as an input to application back-end 518 of executed reporting application 512. Application back-end 518 may perform operations that access a local data repository maintained within a tangible, non-transitory memory, e.g., reporting data store 520 of FIG. 5A, and based on query 534, application back-end 518 may access and obtain SPR report 524 from reporting data store 520. The obtained records of SPR report 524 may identify and characterize each of the auto loans under redemption at, sold by, or redeemed fully by the financial institution on Aug. 2, 2021 (e.g., the prior business day). Application back-end 518 may perform operations that encrypt the records of SPR report 524 using, for example, the public cryptographic key associated with, or generated by, FI computing system 130, and that generate a response to query 534, e.g., response 536, that includes the encrypted records of SPR report 524. Application back-end 518 may perform additional operations that cause AF system 110 to transmit response 536 across network 120 to FI computing system 130.

Figure 5B:
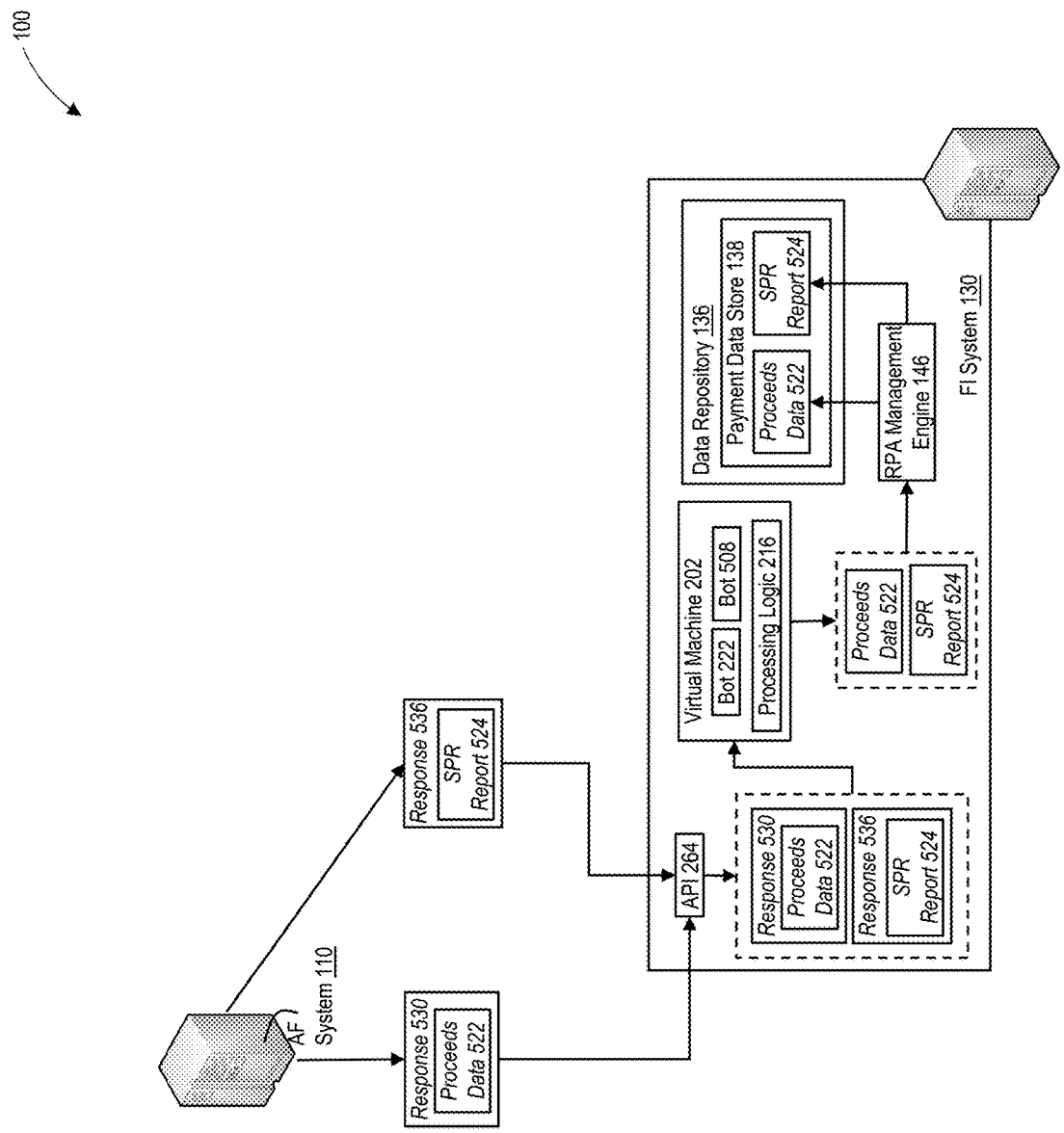

Referring to FIG. 5B, one or more programmatic interfaces established and maintained by FI computing system 130, such API 264 associated with virtual machine 202, may receive response 530 (that includes the encrypted elements of proceeds data 522) and response 536 (that includes the encrypted records of SPR report 524) from AF system 110, and may route responses 530 and 536 to executed virtual machine 202. In some instances, not illustrated in FIG. 5B, executed virtual machine 202 may perform any of the exemplary processes described herein that cause executed programmatic bot 222 to provide additional input data to AF system 110 that logs out of GUI 230 and GUI 516.

In some instances, virtual machine 202 may parse each of responses 530 and 536, and may perform operations that extract, from a respective one of responses 530 and 536, the encrypted elements of proceeds data 522 and the encrypted records of SPR report 524, which virtual machine 202 may provide as inputs to executed RPA management engine 146. Executed RPA management engine 146 may receive the encrypted elements of proceeds data 522 and the encrypted records of SPR report 524 from virtual machine 202, and in some instances, executed RPA management engine 146 may obtain, from data repository 136, a private cryptographic key associated with, or generated by, FI computing system 130. Using the private cryptographic key, executed RPA management engine 146 may decrypt the encrypted elements of proceeds data 522 to yield decrypted elements of proceeds data 522, and may decrypt the encrypted records of SPR report 524 to yield decrypted records of SPR report 524.

In some instances, executed RPA management engine 146 may perform operations that store the decrypted elements of proceeds data 522 and the decrypted records of SPR report 524 within corresponding portions of payment data store 138 of data repository 136. Further, although not illustrated in FIG. 5B, executed RPA management engine 146 may perform any of the exemplary processes described herein to generate one or more elements of session data, which may confirm the successful receipt of the elements of proceeds data 522 and the records of SPR report 524 from AF system 110, and store the elements of session data within data repository 136.

As described herein, the elements of processing logic 216 provisioned to virtual machine 202 may encode sequential operations that, when performed by executed programmatic bots 222 and 510 in accordance with the predetermined schedule (e.g., at 4:30 p.m. on a daily basis), cause executable objects 218 and 508 to request and receive respective ones of the elements of proceeds data 522 and the records of SPR report 524 from AF system 110. In some examples, as described herein, the elements of processing logic 216 provisioned to virtual machine 202 may also encode additional sequential operations that, when performed by one or more of executed programmatic bots 222 and 510 in response to the receipt of the elements of proceeds data 522 and the records of SPR report 524, cause one or more of executed programmatic bots 222 and 510 to compile additional data records, or update existing data records, within SPR report 524 to reflect the auto loans under redemption at, sold or assigned by, and/or fully redeemed by the financial institution during the current business day, e.g., Aug. 3, 2021.

Figure 5C:
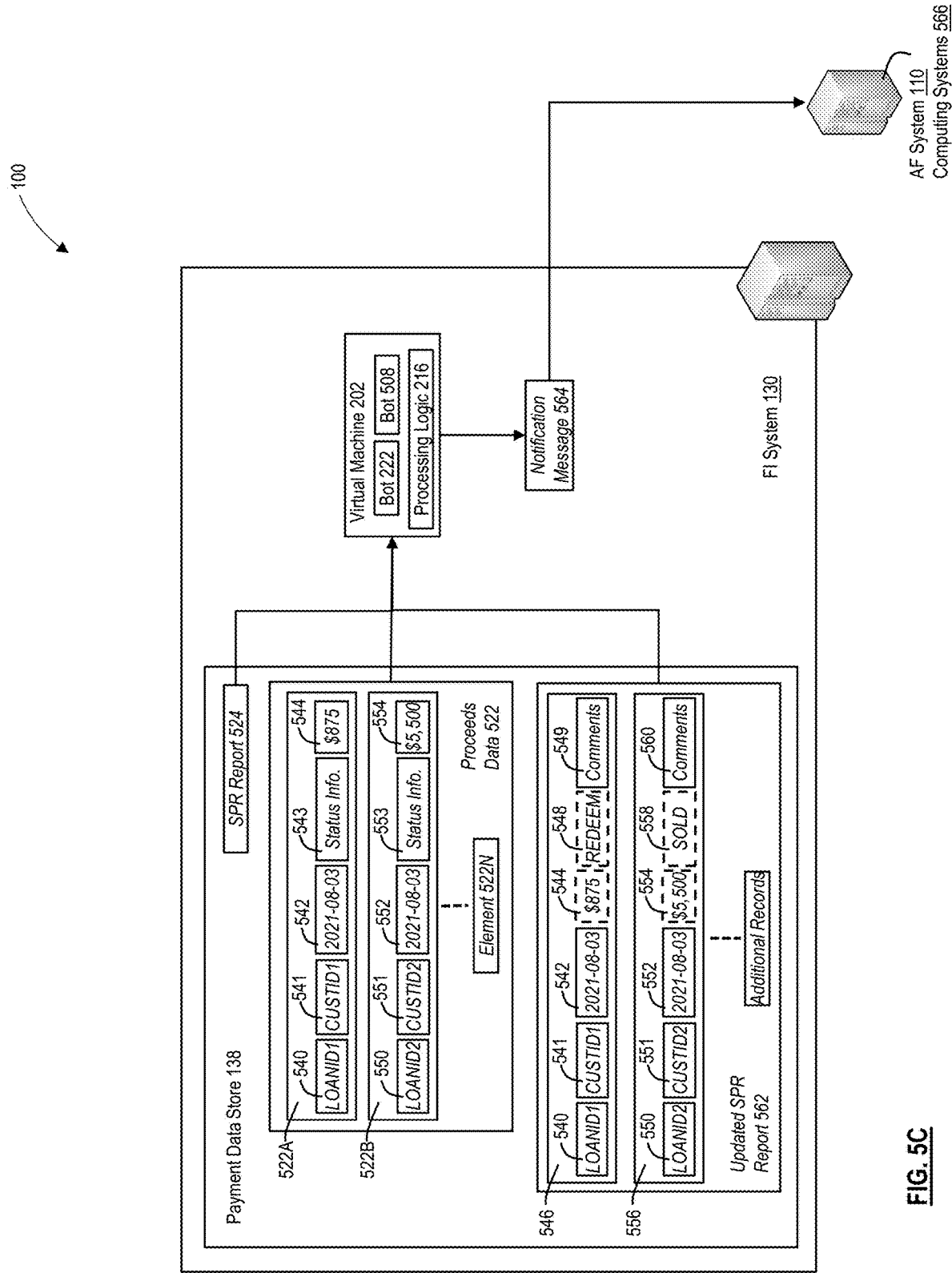

Referring to FIG. 5C, the elements of proceeds data 522 (e.g., as maintained within payment data store 138) may include a plurality of discrete elements 522A, 522B, . . . 522N, each of which identifies and characterizes corresponding ones of the auto-loan payments currently under redemption at, sold or assigned by, and/or redeemed fully by the financial institution on Aug. 3, 2021. By way of example, each of the elements of proceeds data 522 may include one or more of: (i) a unique loan identifier of the corresponding auto-loan (e.g., a loan account number, etc.); (ii) a unique customer identifier of a customer associated with the corresponding auto loan (e.g., a customer name or a unique alphanumeric identifier assigned to the customer by the financial institution, such as an alphanumeric access or login credential); (iii) a temporal identifier of the current business day (e.g., Aug. 3, 2021); and/or (iv) a status data indicative of a current status of the corresponding auto loan, e.g., currently under redemption, sold, or redeemed fully, etc. Further, in some instances, each of the elements of proceeds data 522 may also include further information characterizing an amount of proceeds derived from the corresponding auto loan on Aug. 3, 2021, e.g., from cleared and settled auto-loan payments associated with auto loans under redemption, or from the sale or assignment of auto-loans to the third-party loan servicer. The elements of proceeds data 522 may be formatted in one or more structured or unstructured formats, such as, but not limited to, as an unstructured text file, a delimited text file (e.g., a commas-separated values (CSV) file), an Extended Markup Language (XML) file, or as a file formatted for consistency with one or more application programs (e.g., an Excel™ file, and PDF document, etc.).

Further, in some examples, SPR report 524 may also include a plurality of discrete records, each of which identify and characterize a particular auto loan under redemption at, sold or assigned by, and/or fully redeemed by the financial institution on the prior business day (e.g., Aug. 2, 2021). Each of the discrete records may include a plurality of sequential data fields, and SPR report 524 may be associated with information (e.g., schema data) that identifies each of the sequential data fields and a structure or format of the elements of data maintained within each of the data fields. By way of example, the data fields within each of the reports of SPR report 524 may include, but are not limited to: a loan-identifier field (e.g., that maintains a loan account number of a particular auto loan); a customer identifier field (e.g., that maintains a unique customer identifier, such as a customer name or an alphanumeric access or login credential, of a customer that holds a particular auto loan); a date field that maintains a corresponding calendar date; a status field that labels a particular auto loan as currently under redemption, sold, or redeemed fully on the calendar date, a proceeds field that includes an amount of proceeds derived from a particular auto loan on the calendar date, and further, a comment field that includes structured or unstructured comments regarding a particular auto loan. SPR report 524 may also be formatted in one or more structured or unstructured formats, such as, but not limited to, as an unstructured text file, a delimited text file (e.g., a commas-separated values (CSV) file), an Extended Markup Language (XML) file, or as a file formatted for consistency with one or more application programs (e.g., an Excel™ file, and PDF document, etc.).

In some instances, executed RPA management engine 146 may perform additional operations that provision, to instantiated virtual machine 202, the elements of proceeds data 522 and the records of SPR report 524, e.g., as maintained within payment data store 138 data repository 136. Based on elements 522A, 522B, . . . 522N of proceeds data 522, one or more of the programmatic bots executed by virtual machine 202, such as executed programmatic bot 222 or as executed programmatic bot 508, may perform operations, consistent with the elements of processing logic 216, that compile additional records of SPR report 524, or that update the records of SPR report 524, to reflect those auto-loans currently under redemption, sold by the financial institution (and in some instances, fully redeemed by the financial institution) during the current temporal interval, i.e., during August $3^{rd}$ business day, along with data characterizing the proceeds derived from the sale or redemption of these auto loans on August $3^{rd}$.

By way of example, executed programmatic bot 222 may access element 522A of proceeds data 522, which identifies and characterizes a status of, and proceeds derived from, a corresponding one of the auto loans on Aug. 3, 2021. As illustrated in FIG. 2C, element 522A may include a loan identifier 540 of the corresponding auto loan (e.g., the alphanumeric character string "LOANID1"), a customer identifier 541 associated with the customer that holds the corresponding auto loan (e.g., the alphanumeric character string "CUSTID1"), and a temporal identifier 542 (e.g., "2021-08-03"). Further, element 522A may include a status information 543 indicative that the corresponding auto loan is currently under redemption at the financial institution as of Aug. 3, 2021, and proceeds information 544 specifying that the financial institution received proceeds in the amount of $875 from a cleared and settled auto-loan payment on Aug. 3, 2021.

In some instances, and based on status information 543, executed programmatic bot 222 may perform operations, consistent with the elements of processing logic 216, that confirm the corresponding auto loan associated with element 522A is currently under redemption at the financial institution. Executed programmatic bot 222 may perform additional operations, consistent with the elements of processing logic 216, that access a new record within SPR report 524, such as record 546, and incorporate all, or a selected portion, of loan identifier 540, customer identifier 541, temporal identifier 542, status information 543, and proceeds information 544 within accessed record 546 of SPR report 524. By way of example, and in accordance with the elements of processing logic 216, executed programmatic bot 222 may perform operations that copy the all, or the selected portion of, loan identifier 540, customer identifier 541, temporal identifier 542, and proceeds information 544 from accessed element 522A, and that paste the copied portions of loan identifier 540, customer identifier 541, temporal identifier 542, and proceeds information 544 within the corresponding data fields of record 546, e.g., within respective ones of the loan-identifier field, customer identifier field, date field, and proceeds field.

Executed programmatic bot 222 may perform operations, consistent with the elements of processing logic 216, that selectively format portions of the loan identifier 540, customer identifier 541, temporal identifier 542, and proceeds information 544 once incorporated into record 546 of SPR report 524 to reflect a structure or a format of corresponding ones of the loan-identifier field, customer identifier field, date field, and proceeds field. In other instances, executed programmatic bot 222 may perform additional, or alternate, operations, consistent with the elements of processing logic 216, that modify a structure of the data fields within record 546 of SPR report 524 for consistency with element 522A of proceeds data 522, e.g., to modify a sequential order of the data fields, to add one or more additional data fields, to remove one or more data fields, or to modify a structure or format of one or more of the data fields within record 546.

Further, in some instances, executed programmatic bot 222 may perform operations, consistent with the elements of processing logic 216, that process status information 543 and generate an alphanumeric label 548 representative of the current status of the corresponding auto loan on Aug. 3, 2021. For example, status information 543 may indicate that the corresponding auto loan is currently under redemption at the financial institution as of Aug. 3, 2021, and executed programmatic bot 222 may, in accordance with the elements of processing logic 216, generate an alphanumeric character string "REDEEM" (e.g., label 548) that represents the current status of the corresponding auto loan, and populate the status field of record 546 with the label 548, e.g., the alphanumeric character string "REDEEM." Executed programmatic bot 222 may also perform operations, consistent with the elements of processing logic 216, that populate the comment field of record 546 with one or more textual comments 549 that characterize the corresponding auto loan or the proceeds derived from the auto loan during the current business day, or during one or more prior temporal intervals. Examples of these textual comments may include, but are not limited to, comments that identify a remaining portion (e.g., a number of months or days) of the redemption period of the corresponding auto loan, an outstanding balance (e.g., principal and/or interest) of the corresponding auto loan, and/or an amount of proceeds derived from the corresponding auto loan since an origination date.

Consistent with the elements of processing logic 216, executed programmatic bot 222 may also perform, repetitively, the exemplary processes described herein to generate an additional record of SPR report 524 that identifies and characterizes each additional or alternate one of the auto-loan payments currently under redemption on Aug. 3, 2021, sold or assigned to third-party loan services on Aug. 3, 2021, and/or redeemed fully by the financial institution on Aug. 3, 2021, e.g., associated with corresponding ones of elements 522B, . . . 522N of proceeds data 522. For example, executed programmatic bot 222 may access element 522B of proceeds data 522, which identifies and characterizes a status of, and proceeds derived from, an additional one of the auto loans on Aug. 3, 2021. As illustrated in FIG. 5C, element 522B may include a loan identifier 550 of the additional auto loan (e.g., the alphanumeric character string "LOANID2"), a customer identifier 551 associated with the customer that holds the additional auto loan (e.g., the alphanumeric character string "CUSTID2"), and a temporal identifier 552 (e.g., "2021-08-03"). Further, element 522B may also include a status information 553 indicative that the financial institution sold the additional auto loan to a third-party loan servicer on Aug. 3, 2021, and proceeds information 554 specifying that the financial institution received proceeds in the amount of $5,500 from the sale of the additional auto loan on Aug. 3, 2021.

In some instances, and based on status information 553, executed programmatic bot 222 may perform operations, consistent with the elements of processing logic 216, that confirm the financial institution sold the additional loan associated with element 522B to a third-party loan services. Executed programmatic bot 222 may perform any of the exemplary processes described herein, consistent with the elements of processing logic 216, that access a new record within SPR report 524, such as record 556, and incorporate all, or a selected portion, of loan identifier 550, customer identifier 551, temporal identifier 552, status information 553, and proceeds information 554 within accessed record 556 of SPR report 524. By way of example, and in accordance with the elements of processing logic 216, executed programmatic bot 222 may perform operations that copy the all, or the selected portion of, loan identifier 550, customer identifier 551, temporal identifier 552, and proceeds information 555 from accessed element 522B, and that paste the copied portions of loan identifier 550, customer identifier 551, temporal identifier 552, and proceeds information 554 within the corresponding data fields of record 556, e.g., within respective ones of the loan-identifier field, customer identifier field, date field, and proceeds field.

Executed programmatic bot 222 may perform operations, consistent with the elements of processing logic 216, that selectively format portions of the loan identifier 550, customer identifier 551, temporal identifier 552, and proceeds information 554 once incorporated into record 556 of SPR report 524 to reflect a structure or a format of corresponding ones of the loan-identifier field, customer identifier field, date field, and proceeds field. In other instances, executed programmatic bot 222 may perform additional, or alternate, operations, consistent with the elements of processing logic 216, that modify a structure of the data fields within record 556 of SPR report 524 for consistency with element 522B of proceeds data 522, e.g., to modify a sequential order of the data fields, to add one or more additional data fields, to remove one or more data fields, or to modify a structure or format of one or more of the data fields within record 556.

Further, in some instances, executed programmatic bot 222 may perform operations, consistent with the elements of processing logic 216, that process status information 553 and generate an alphanumeric label 558 representative of the current status of the additional auto loan on Aug. 3, 2021. For example, status information 553 may indicate that the financial institution sold the additional auto loan to a third-party loan servicer on of Aug. 3, 2021, and executed programmatic bot 222 may, in accordance with the elements of processing logic 216, generate an alphanumeric character string "SOLD" (e.g., label 558) that represents the current status of the corresponding auto loan, and populate the status field of record 556 with the label 558, e.g., the alphanumeric character string "SOLD." Executed programmatic bot 222 may also perform operations, consistent with the elements of processing logic 216, that populate the comment field of record 556 with one or more textual comments 560 that characterize the additional auto loan or the proceeds derived from the additional auto loan during the current business day, or during one or more prior temporal intervals, or the sale of the additional auto loan. Examples of these textual comments may include, but are not limited to, comments that identify the third-party loan servicer, a remaining portion (e.g., a number of months or days) of the redemption period of the additional auto loan, or an amount of proceeds derived from the additional auto loan prior to the sale.

In other instances, not illustrated in FIG. 5C, executed programmatic bot 222 may perform any of the exemplary processes described herein, consistent with the elements of processing logic 216, to generate an additional record within SPR report 524 that identifies and characterizes an additional, or alternate, one of the auto loans redeemed fully by the financial institution on Aug. 3, 2021. For example, as described herein, executed programmatic bot 222 may perform operations, consistent with the elements of processing logic 216, that copy all, or a selected portion of, a loan identifier, a customer identifier, a temporal identifier, and proceeds information from a corresponding element of proceeds data 522 associated with the fully redeemed auto loan, and that paste the copied portions of the loan identifier, customer identifier, temporal identifier, and proceeds information within the corresponding data fields of an additional record of SPR report 524, e.g., within respective ones of the loan-identifier field, customer identifier field, date field, and proceeds field.

Further, using any of the exemplary processes described herein, and consistent with the elements of processing logic 216, executed programmatic bot 222 may process status information that characterizes the fully redeemed auto loan (e.g., as maintained within the corresponding element of proceeds data 522), may generate an alphanumeric label representative of the fully redeemed status of the corresponding auto loan, such as, but not limited to, an alphanumeric character string "REDEEMED," and may populate the status field of record for the additional record with the "REDEEMED" label. Executed programmatic bot 222 may also perform operations, consistent with the elements of processing logic 216, that populate the comment field of the additional record with one or more textual comments that characterize the fully redeemed auto loan, such as, but not limited to, an amount of proceeds derived from the fully redeemed auto loan over the redemption period.

These exemplary processes may be implemented by executed programmatic bot 222 to populate the data fields of further records of SPR report 524 with selected accessed portions of corresponding ones of elements 522C, . . . 522N of proceeds data 522, which identify and characterize each additional or alternate one of the auto-loan payments currently under redemption on Aug. 3, 2021, sold or assigned to third-party loan services on Aug. 3, 2021, or redeemed fully by the financial institution on Aug. 3, 2021. In some instances, and upon completion of these exemplary processes, executed programmatic bot 222 may perform operations, consistent with the elements of processing logic 216, that store SPR report 524, which includes additional records compiled using any of the exemplary processes described herein, as an updated SPR report 562 associated with the current business day (e.g., Aug. 3, 2021) within a corresponding portion of data repository 136, e.g., within payment data store 138. Further, executed programmatic bot 222 may also perform operations, consistent with the elements of processing logic 216 that generate a notification message 564 indicative of a successful completion of updated SPR report 562, which reflects, and identifies and characterizes, the auto-loan payments currently under redemption on Aug. 3, 2021, sold or assigned to third-party loan services on Aug. 3, 2021, and/or redeemed fully by the financial institution on Aug. 3, 2021

As illustrated in FIG. 5C, virtual machine 202 may route updated SPR report 562 and notification message 564 to executed RPA management engine 146, which may perform operations that cause FI computing system 130 to transmit notification message 564, and in some instances, updated SPR report 562, across network 120 to one or more computing systems 566 associated with, or operated by, the financial institution, such as, but not limited to AF system 110. By way of example, executed RPA management engine 146 may perform operations that cause FI computing system 130 to transmit notification message 564 as an email message to one or more email addresses associated with the financial institution (e.g., an email address associated with AF system 110), with updated SPR report 562 being included as an attachment to the email message. Further, although not illustrated in FIG. 5C, executed RPA management engine 146 may perform any of the exemplary processes described herein to generate and distribution of updated SPR report 562 and notification message 564, and store the elements of session data within a portion of data repository 136. In some instances, illustrated in FIG. 5C, AF system 110 may receive updated SPR report 562 across network 120 via a programmatic interface, such as an API (not illustrated in FIG. 5C), and executed reporting application 512 may store updated SPR report 562 within a portion of reporting data store 520.

Figure 6:
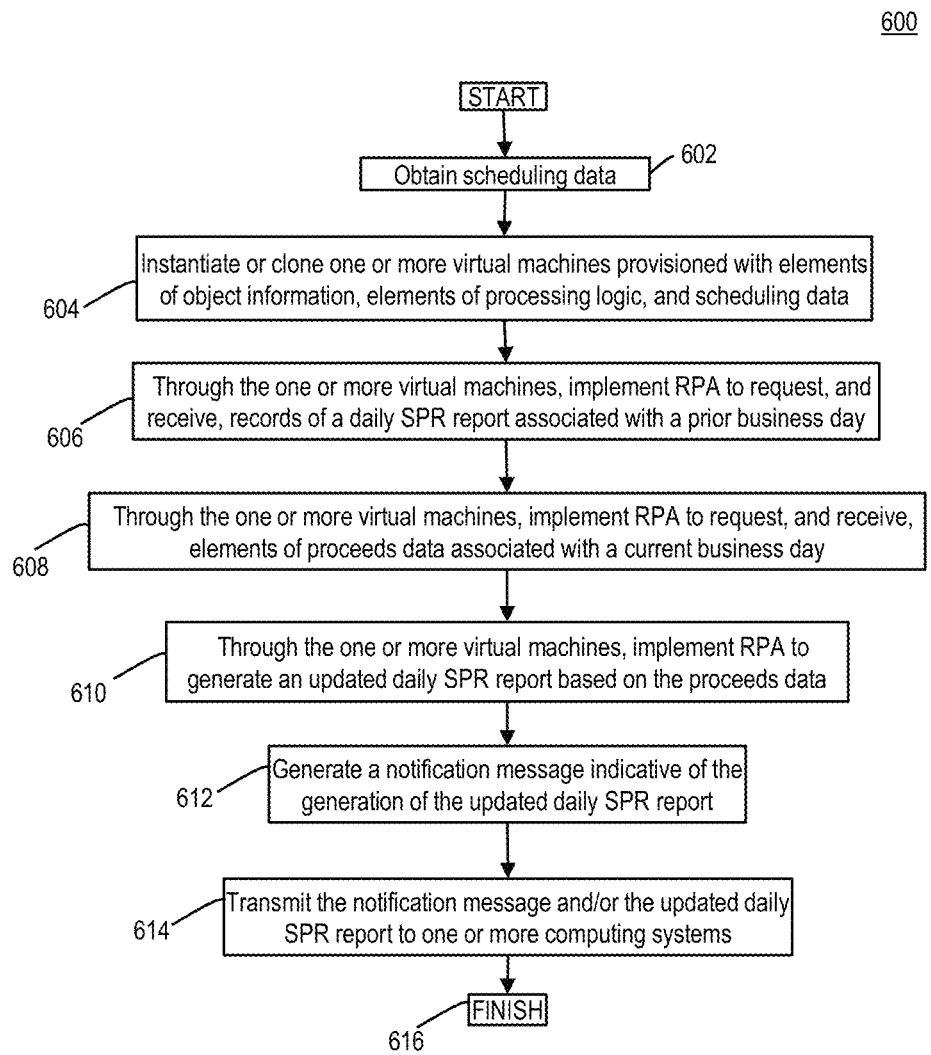
FIG. 6 is a flowchart of an exemplary process for managing reporting workflow using robotic process automation, in accordance with some exemplary embodiments.

FIG. 6 is a flowchart of an exemplary process 600 for managing reporting workflows using robotic process automation, in accordance with disclosed exemplary embodiments. For example, a network-connected computing system operating within environment 100, such as FI computing system 130, may perform one or more of the steps of exemplary process 600, which include, among other things, detecting an occurrence of a temporal event that triggers a generation of an updated SPR report identifying and characterizing one or more auto loans under redemption at a financial institution during a current business day, one or more of the auto loans sold or assigned by the financial institution to unrelated, third-party loan servicers during the current business day, and further, one or more of the auto loans fully redeemed by the financial institution during the current business day.

Through an execution of one or more programmatic software robots ("bots") by these virtual machines, the virtual machines instantiated by FI computing system 130 may implement any of the exemplary robotic process automation (RPA) techniques described herein to request and receive elements of proceeds data that identify and characterize the auto loans under redemption, sold by the financial institution, or redeemed fully by the financial institution during the current business day, along with data characterizing the proceeds derived from the sale or redemption of these auto loans during a current business day, from a graphical user interface (GUI) associated with a first application program executed at a computing system (e.g., payment application 226 executed at AF system 110, as described herein). Further, the virtual machines instantiated by FI computing system 130 may also implement any of the RPA techniques described herein to request and receive records of an SPR report that identify and characterize auto loans under redemption, sold, or redeemed fully by the financial institution during a prior temporal interval that includes a prior business day. Based on the elements of proceeds data, the virtual machines instantiated by FI computing system 130 may also implement any of the RPA techniques described herein to modify the SPR report to include records that identify and characterize the auto loans under redemption, sold by, or redeemed fully by the financial institution during the current business day, and generate an updated SPR report for the current business day that includes the modified records.

Referring to FIG. 6, FI computing system 130 may perform any of the exemplary processes described herein to obtain scheduling data that specifies a predetermined temporal schedule for an initiation of the exemplary report compilation processes described herein (e.g., in step 602). For example, the predetermined schedule may be established by the financial institution, and may specify an initiation of the exemplary processes that generate the updated SPR report at a predetermined time on a daily basis, such as at 4:30 p.m. or close-of-business. In some examples, FI computing system 130 may store the scheduling data within one or more tangible, non-transitory memories, such as, but not limited to, within a corresponding portion of data repository 136.

FI computing system 130 may also perform any of the exemplary processes described herein to instantiate one or more virtual machines provisioned with elements of object information, elements of processing logic, and the scheduling data, and additionally, or alternatively, to clone one or more previously instantiated and provisioned virtual machines (e.g., in step 604). As described herein, each of the provisioned elements of the object information may include an application model and action data, and when processed by the instantiated or cloned virtual machines, the provisioned elements of object information may enable each of the instantiated or cloned virtual machines to generate one or more executable objects based on corresponding ones of the application models and action data, and to establish one or more programmatic software robots (e.g., "bot"), each which includes a corresponding one of the generated executable objects.

By way of example, each of the application models may expose a corresponding one of the executable objects, and as such, one or more of the programmatic bots that include the corresponding executable object, to an application program executed by a computing system within environment 100 (e.g., a respective one of payment application 226 and reporting application 512 executed by AF system 110, which maintains the elements of proceeds data 522 and the records of SPR report 524 within corresponding data repositories) and further, may identify and characterize interface elements displayed within one or more display screens of a GUI or digital portal generated and presented by a front-end component of that executed application (e.g., a respective one of GUI 230 presented by front-end 228 of executed payment application 226, and GUI 516 presented by front-end 514 of executed reporting application 512). Additionally, and as described herein, the action data associated with each of the application models may include those discrete or sequential actions that the corresponding executable object, and the one or more programmatic bots that include the corresponding executable object, may perform during interaction with the GUIs or the digital portals in accordance with the application model and the elements of processing logic.

Further, and as described herein, the elements of processing logic may encode sequential operations performed by corresponding ones of the executed programmatic bots in accordance with the predetermined schedule specified within the scheduling data. In some instances, one or more of the executed programmatic bots may be configured by the elements of the processing logic to interact with a corresponding one of the application programs executed by AF system 110, and to perform actions or operations specified by the elements of processing logic and consistent with the scheduling data, such as, but not limited to, logging into the corresponding GUI or digital portal associated with the application programs executed by AF system 110 (e.g., GUI 230 presented by front-end 228 of executed payment application 226 and GUI 516 presented by front-end 514 of executed reporting application 512), requesting and receiving elements of proceeds data and records of an SPR report maintained by respective ones of payment data store 234 and reporting data store 520 of AF system 110, and logging out of the corresponding GUI or digital portal. Further, the elements of the processing logic may also configure one or more of the executed programmatic bots to perform any of the exemplary processes described herein that, in accordance with the predetermined schedule, based on the received records of the SPR report and elements of the proceeds data, and generate corresponding records of an updated SPR report that reflect, and characterizes, the proceeds received during the current business day.

Further, in accordance with accordance with the predetermined schedule, upon execution by FI computing system 130, an additional, or alternate, programmatic bot established by one or more of the instantiated or cloned virtual machines may implement any of the exemplary RPA-based techniques described herein (e.g., in accordance with the provisioned elements of processing logic) to request, and receive, the SPR report from a computing system associated with the financial institution (e.g., in step 606). As described herein, the predetermined schedule may specify that the programmatic bot request and receive the records of the SPR report at a predetermined time on a daily basis, such as at 4:30 p.m., and the SPR report may identify and characterize each of the auto loans under redemption at the financial institution during a prior business day, each of the auto loans sold or assigned by the financial institution to unrelated, third-party loan servicers during the prior business day, and further, each of the auto loans fully redeemed by the financial institution during the prior business day. By way of example, and as described herein, the elements of processing logic provisioned to each of the virtual machines may encode sequential operations that, when performed by additional, or alternate, executed programmatic bots, cause a respective one of the executable objects to access GUI 516 generated and presented by front end 514 of reporting application 512 executed by AF system 110, and to request and receive, via accessed GUI 516, one or more records of SPR report 524 maintained within reporting data store 520 of AF system 110.

In accordance with the predetermined schedule, and upon execution by FI computing system 130, a programmatic bot established by one or more of the instantiated or cloned virtual machines may implement any of the exemplary RPA-based techniques described herein (e.g., in accordance with the provisioned elements of processing logic) to request, and receive, elements of proceeds data from a computing system associated with the financial institution (e.g., in step 608). As described herein, the predetermined schedule may specify that the programmatic bot request and receive the elements of proceeds data at a predetermined time on a daily basis, such as at 4:30 p.m., and the elements of proceeds data (e.g., the elements of proceeds data 522, described herein) may identify and characterize each of those auto-loan under redemption, sold by the financial institution (and in some instances fully redeemed by the financial institution) during a current business day, along with data characterizing the proceeds derived from the sale or redemption of these auto loans during a current business day. By way of example, and as described herein, the elements of processing logic provisioned to each of the virtual machines may encode sequential operations that, when performed by the executed programmatic bot, cause a respective one of the executable objects to access GUI 230 generated and presented by front end 228 of payment application 226 executed by AF system 110, and to request and receive, via accessed GUI 230, one or more elements of proceeds data 522 maintained within payment data store 234 of AF system 110.

In some examples, and upon execution by FI computing system 130, one or more of the programmatic bots established by one or more of the instantiated or cloned virtual machines may implement any of the exemplary RPA-based techniques described herein (e.g., in accordance with the provisioned elements of processing logic) to modify portions of the SPR report to incorporate information that identifies, characterizes, and reflects the auto loans under redemption, sold or assigned by the financial institution, or fully redeemed by the financial institution during the current business day based on corresponding ones of the received element of proceeds data, and to generate an updated SPR report (e.g., in step 610). As described herein, the elements of proceeds data may include a plurality of discrete elements (e.g., elements 522A, 522B, . . . 522N of proceeds data 522), each of which identifies and characterizes a corresponding ones of the auto-loan payments currently under redemption on the current business day, sold or assigned to third-party loan services on the current business day, and/or redeemed fully by the financial institution on the current business day, and specifies the proceeds derived by the financial institution from these auto loans on a daily basis.

Further, and as described herein, the received records of the SPR report may include a plurality of discrete records, each of which identify and characterize a particular auto loan under redemption, sold or assigned by, and/or fully redeemed by the financial institution on the prior business day. Further, each of the discrete records may include a plurality of sequential data fields, and the SPR report may be associated with information (e.g., schema data) that identifies each of the sequential data fields and a structure or format of the elements of data maintained within each of the data fields. In some instances, in step 610, one or more of the executed programmatic bots may implement any of the exemplary RPA-based techniques described herein to access each of the received elements of proceeds data, and for each of auto loans identified and characterized by the accessed elements of proceeds data, to update an existing record of the SPR report, or to generate an additional record of the SPR report, that includes at least a portions of the data maintained within a corresponding one of the elements of proceeds data (e.g., a loan identifier, a customer identifier, a temporal identifier, and proceeds information, etc.), a label characterizing status of the auto loan (e.g., under redemption, sold, fully redeemed, etc.), along with loan-specific comments.

Further, the one or more of the executed programmatic bots may also perform any of the exemplary processes described herein, in accordance with the elements of processing logic, to generate a notification message (e.g., an email message, etc.) that indicates, and confirms, a successful completion of the updated SPR report for the current business day (e.g., in step 612 of FIG. 6). FI computing system 130 may also perform any of the exemplary processes described herein to transmit the generated notification message, and in some instances, the updated SPR report, across network 120 to one or more computing systems associated with, or operated by, the financial institution, such as, but not limited to AF system 110 (e.g., in step 614). By way of example, FI computing system 130 may transmit the notification message as an email message to one or more email addresses associated with the financial institution (e.g., an email address associated with AF system 110), with the updated SPR report being included as an attachment to the email message, and in some instances, AF system 110 may perform operations that store the updated SPR report within a corresponding data repository, e.g., within reporting data store 520. Exemplary process 600 is then complete in step 616.

Figure 7:
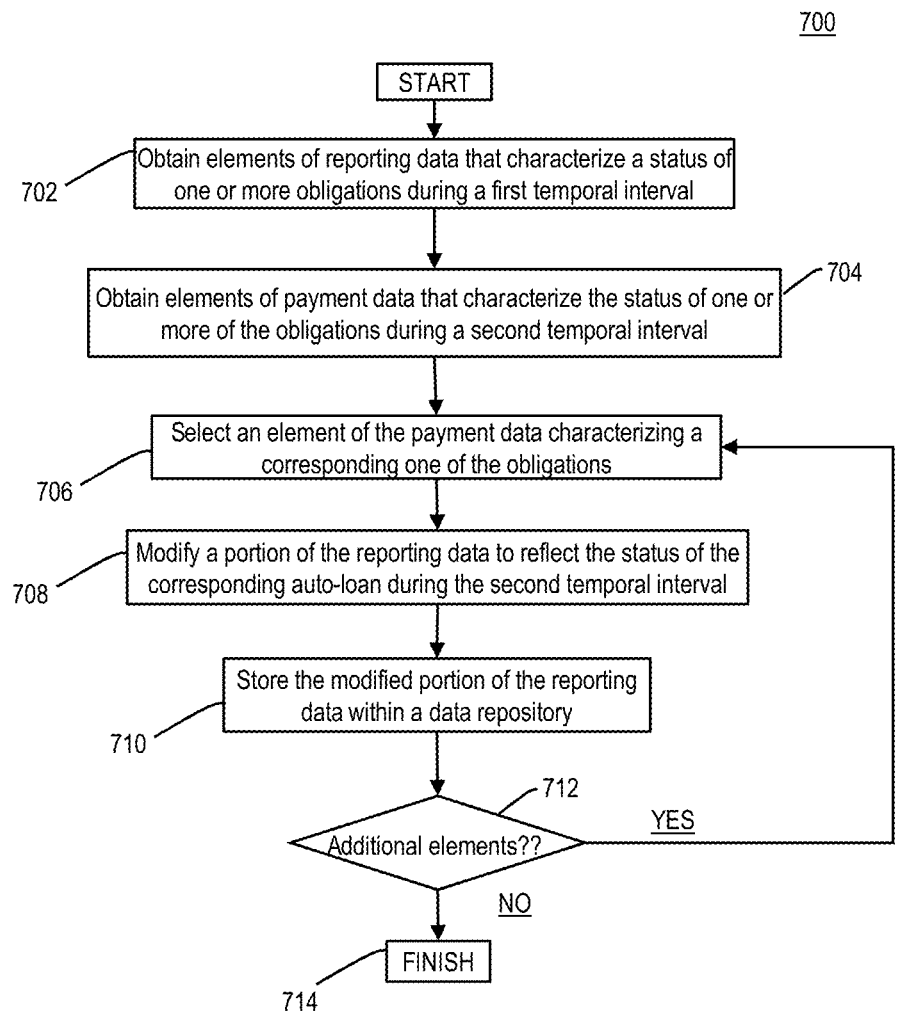
FIG. 7 is a flowchart of an exemplary process for generating reporting data, in accordance with some exemplary embodiments.

FIG. 7 is a flowchart of an exemplary process 700 for modifying elements of reporting data to characterize a status of one or more obligations during a corresponding temporal interval using robotic process automation (RPA), in accordance with disclosed exemplary embodiments. For example, a programmatic software robot (e.g., a "bot") executing a virtual machine instantiated or cloned by FI computing system 130 may perform one or more of the exemplary steps of process 700 in accordance with elements of processing logic provisioned to the instantiated or closed virtual machine, and based on elements of proceeds data and records of SPR report received, via a virtualized implementation of any of the exemplary RPA techniques described herein.

Referring to FIG. 7, the executed programmatic bot may, in accordance with the elements of processing logic, perform any of the exemplary processes described herein to obtain elements of reporting data that characterize a status of one or more obligations during a first temporal interval (e.g., in step 702 of FIG. 7), and that obtain elements of payment data that characterize the status of one or more of the obligations during a second temporal interval (e.g., in step 704 of FIG. 7). By way of example, the one or more obligations may include auto loans issued by a financial institution to corresponding customers, and as described herein, the first temporal interval may correspond to a prior business day of the financial institution, and the second temporal interval may corresponding to a current business day of the financial institution.

As described herein, elements of reporting data may include discrete data records of an existing sales, proceeds, and redemptions (SPR) report that identify and characterize one or more of the auto loans under redemption at a financial institution during the first temporal interval, one or more of the auto loans sold or assigned by the financial institution to unrelated, third-party loan servicers during the first temporal interval, and further, one or more of the auto loans fully redeemed by the financial institution during the first temporal interval (e.g., previous business day). The elements of payment data may, in some instances, include the elements of proceeds data that identify and characterize each of the auto loans under redemption, sold by the financial institution, and/or redeemed fully by the financial institution during the second temporal interval (e.g., a current business day), along with data characterizing the proceeds derived from the sale or redemption of these auto loans during the second temporal interval (e.g., current business day).

The executed programmatic bot may, in accordance with the elements of processing logic, perform any of the exemplary processes described herein to access an element of the payment data characterizing a corresponding one of the obligations (e.g., in step 706 of FIG. 7). The accessed element of the payment data may, for example, include an element of the proceeds data that identifies and characterizes a status of, and proceeds derived from, the corresponding auto loan during the current business day (e.g., the second temporal interval), and the accessed element of the proceeds data may include, for the corresponding loan, a loan identifier (e.g., a loan account number, etc.), a customer identifier of the customer that holds the corresponding auto loan (e.g., a customer name or an alphanumeric character string, such as a login credential), a temporal identifier of the current business day, status information characterizing the status of the corresponding auto loan during the current business day, and proceeds information identifying the proceeds received from the corresponding auto loan during the current business day.

Further, the executed programmatic bot may also perform any of the exemplary processes described herein, consistent with the elements of processing logic, that modify a portion of the reporting data to reflect the status of the corresponding auto-loan during the second temporal interval (e.g., in step 708 of FIG. 7). By way of example, in step 708, the executed programmatic bot may also perform any of the exemplary processes described herein, consistent with the elements of processing logic to copy all, or a selected portion of, the loan identifier, the customer identifier, the temporal identifier, and the proceeds information from the accessed element of the proceeds data, and that paste the copied portions of the loan identifier, the customer identifier, the temporal identifier, and the proceeds information within corresponding data fields of a record of the SPR report, e.g., within respective ones of a loan-identifier field, customer identifier field, date field, and proceeds field of the SPR report. The record of the SPR report may, in some instances, represent a new record within the SPR report, or may represent an existing record of the SPR report that includes the loan identifier and/or the customer identifier.

In step 708, the executed programmatic bot may perform operations, consistent with the elements of processing logic, that selectively format portions of the loan identifier, customer identifier, temporal identifier, and proceeds information once incorporated into the record of the SPR report to reflect a structure or a format of corresponding ones of the loan-identifier field, customer identifier field, date field, and proceeds field. In other instances, also in step 708, the executed programmatic bot may perform additional, or alternate, operations, consistent with the elements of processing logic, that modify a structure of the data fields within the record of the SPR report for consistency with the element of the proceeds data, e.g., to modify a sequential order of the data fields, to add one or more additional data fields, to remove one or more data fields, or to modify a structure or format of one or more of the data fields within the record.

Further, in step 708, the executed programmatic bot may perform any of the exemplary processes described herein, consistent with the elements of processing logic, that process the status information maintained within the accessed element of the proceeds data, and that generate an alphanumeric label indicative of the status of the corresponding auto loan during the current business day (e.g., second temporal interval), and that populate a status field of the record of the SPR report with the generated alphanumeric label. Examples of the alphanumeric label may include, but are not limited to, "REDEEM" (e.g., if the corresponding auto loan were under redemption at the financial institution during the current business day), "SOLD" (e.g., if the corresponding auto loan were sold by the financial institution to a third-party loan servicer during the current business day), or "REDEEMED" (e.g., if the corresponding auto loan were fully redeemed by the financial institution during the current business day).

In some instances, the executed programmatic bot may also perform any of the exemplary processes described herein, consistent with the elements of processing logic, that populate a comment field of record of the SPR report with one or more textual comments that characterize the corresponding auto loan, the status of the corresponding auto loan, or the proceeds derived from the auto loan during the current business day, or during one or more prior temporal intervals (e.g., in step 708). Examples of these textual comments may include, but are not limited to, comments that identify a remaining portion (e.g., a number of months or days) of the redemption period of the corresponding auto loan, an outstanding balance (e.g., principal and/or interest) of the corresponding auto loan, or an amount of proceeds derived from the corresponding auto loan since an origination date.

The executed programmatic bot may perform further operations, consistent with the elements of processing logic, that store the SPR report, as modified to characterize the status of the corresponding auto loan during the current business day, within a corresponding portion of a data repository maintained by FI computing system 130, such as data repository 136 (e.g., in step 710 of FIG. 7). In some instances, the executed programmatic bot may perform operations, consistent with the elements of processing logic, that parse the elements of the payment data (e.g., the proceeds data described herein) and determine whether additional auto loans await reporting processing (e.g., in step 712 of FIG. 7). If the executed programmatic bot were to determine that additional one of the auto loans identified and characterized by the elements of proceeds data await reporting processing (e.g., step 712; YES), exemplary process 700 may pass back to step 706, and the executed programmatic bot may perform any of the exemplary processes described herein, consistent with the elements of processing logic, to access an element of the payment data characterizing a further one of the auto loans. Alternatively, if the executed programmatic bot were to determine that none one of the auto-loan payments await reporting processing (e.g., step 712; NO), exemplary process 700 is complete in step 714.

D. Exemplary Computing Architectures

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, RPA management engine 146, processing logic 216, payment application 226, application front end 228, application back end 232, vendor application 236, application front end 238, application back end 242, application programming interface (API) 264, reporting application 512, application front end 514, application back end 516, can be implemented as one or more computer programs, i.e., one or more modules of computer program instructions encoded on a tangible non-transitory program carrier for execution by, or to control the operation of, a data processing apparatus (or a computer system or a computing device).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network.

Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a memory storing instructions;
   a communications interface; and
   at least one processor coupled to the memory and the communications interface, the at least one processor being configured to execute the instructions to:
      obtain, from the memory, reporting data that characterizes a first status of an obligation during a first temporal interval, the reporting data comprising a customer identifier and a temporal identifier of a second temporal interval, the second temporal interval being subsequent to the first temporal interval;
      perform operations that instantiate a virtual machine, that provision the virtual machine with object information characterizing at least one interface element of a first digital interface of a first application program executed at a first computing system, and that execute at least one software robot on the virtual machine in accordance with elements of processing logic, the at least one software robot executed on the virtual machine performing operations that (i) access programmatically, via the communications interface across a communications network, the first digital interface of the first application program executed at the first computing system; (ii) generate programmatic input for the at least one interface element based on the object information, and provision the programmatic input to the at least one interface element of the first digital interface in accordance with the object information via the communications interface, the programmatic input including the customer identifier and the temporal identifier; and (iii) based on the programmatic input receive, through the first digital interface via the communications interface, status data comprising information that characterizes a second status of the obligation during the second temporal interval;
      modify, within the memory, a portion of the reporting data based on the status data, the modified portion of the reporting data reflecting the second status of the obligation during the second temporal interval; and
      transmit, across the communications network via the communications interface, a notification indicative of the modified portion of the reporting data to the first computing system, the notification comprising the customer identifier.

2. The apparatus of claim 1, wherein the at least one processor is further configured to execute the instructions to, via the communications interface across the communications network, perform operations that (i) access a second digital interface of a second application program executed at the first computing system, and (ii) request and receive the at least a portion of the reporting data through the second digital interface.

3. The apparatus of claim 1, wherein:
   the reporting data characterizes first statuses of a plurality of obligations during the first temporal interval;
   the status data characterizes second statuses of at least a subset of the obligations during the second temporal interval; and
   the at least one processor is further configured to execute the instructions to modify, for each of the subset of the obligations, a corresponding portion of the reporting data to reflect a corresponding one of the second statuses of the obligation during the second temporal interval.

4. The apparatus of claim 1, wherein the at least one processor is further configured to execute the instructions to:
obtain scheduling data associated with the reporting data; and
based on the scheduling data, perform operations that obtain the reporting data during a predetermined portion of the second temporal interval, the reporting data comprising information generated during a programmatic chatbot session.

5. The apparatus of claim 1, wherein the first and second temporal intervals comprise a business day.

6. The apparatus of claim 1, wherein:
provision the instantiated virtual machine with the object information and the elements of processing logic, the object information comprising information that characterizes a first application model associated with the executed first application program; and
the at least one software robot executed on the virtual machine performs operations consistent with the first application model that access the first digital interface of the executed first application program and request the status data through the first digital interface.

7. The apparatus of claim 6, wherein:
the object information further comprises additional information that characterizes a second application model associated with a second application program executed at the first computing system; and
the at least one software robot executed on the virtual machine performs further operations consistent with the second application model that access a second digital interface of the executed second application program and request the reporting data through the second digital interface.

8. The apparatus of claim 1, wherein the at least one software robot executed on the virtual machine performs further operations, consistent with the elements of processing logic, that modify the portion of the reporting data based on the status data.

9. The apparatus of claim 1, wherein:
the modified portion of the reporting data comprises a plurality of data elements associated with corresponding data fields; and
the at least one processor is further configured to execute the instructions to:
populate a first one of the data elements of the reporting data with a corresponding first data element of the status data;
based on a second data element of the status data, establish the second status of the obligation during the second temporal interval, and generate labelling data associated with the established second status;
populate a second one of the data elements of the reporting data with the generated labelling data; and
populate a third one of the data elements of the reporting data with comment data associated with the obligation or the established second status.

10. The apparatus of claim 1, wherein:
the notification comprises the modified portion of the reporting data; and
the at least one processor is further configured to execute the instructions to transmit, via the communications interface, the notification to at least one second computing system.

11. The apparatus of claim 1, wherein:
the reporting data comprises an identifier associated with the obligation; and
the at least one processor is further configured to execute the instructions to, via the communications interface across the communication network, perform operations that request and receive the status data through the first digital interface based on the identifier.

12. The apparatus of claim 1, wherein the first digital interface comprises a graphical user interface generated by the executed first application program and the programmatic input comprises input data for the at least one interface element of the graphical user interface.

13. The apparatus of claim 1, wherein:
the at least one processor is further configured to execute the instructions to provision the processing logic to the instantiated virtual machine; and
the processing logic specifies an interaction between the at least one executed software robot and the first digital interface of the executed first application program.

14. The apparatus of claim 1, wherein the object information comprises a type of the at least one interface element and at least a structure or a format of the programmatic input.

* * * * *